(12) United States Patent
Kerschbaum et al.

(10) Patent No.: US 8,533,487 B2
(45) Date of Patent: Sep. 10, 2013

(54) SECURE LOGICAL VECTOR CLOCKS

(75) Inventors: Florian Kerschbaum, Karlsruhe (DE); Julien Jean-Pierre Vayssiere, Red Hill (AU)

(73) Assignee: SAP AG, Walldorf (DE)

( * ) Notice: Subject to any disclaimer, the term of this patent is extended or adjusted under 35 U.S.C. 154(b) by 907 days.

(21) Appl. No.: 12/570,787

(22) Filed: Sep. 30, 2009

(65) Prior Publication Data

US 2010/0091984 A1 Apr. 15, 2010

Related U.S. Application Data

(60) Provisional application No. 61/119,342, filed on Dec. 2, 2008.

(51) Int. Cl.
*G06F 11/30* (2006.01)
*G06F 12/14* (2006.01)

(52) U.S. Cl.
USPC .......................................................... 713/189

(58) Field of Classification Search
USPC .......................................................... 713/189
See application file for complete search history.

(56) References Cited

U.S. PATENT DOCUMENTS

| | | | |
|---|---|---|---|
| 6,401,204 B1 * | 6/2002 | Euchner et al. | 713/169 |
| 2003/0160896 A1 * | 8/2003 | Ho Kim | 348/470 |
| 2005/0066174 A1 * | 3/2005 | Perlman | 713/176 |

FOREIGN PATENT DOCUMENTS

EP 1804416 A1 7/2007

OTHER PUBLICATIONS

Extended EP Search Report for EP Application No. 07018987.3, mailed Feb. 20, 2008, 10 pages.
Response to Extended EP Search Report for EP Application No. 07018987.3, filed Jul. 14, 2009, 40 pages.
Noar, M., et al, "Efficient Oblivious Transfer Protocols", Proceedings of the 12th Annual ACM-SIAM Symposium on Discrete Algorithms (Jan. 7-9, 2001), pp. 448-457.
Smith, S. W., et al, "Security and Privacy For Partial Order Time", Proceedings of the 1994 Parallel and Distributed Computing Systems Conference (Oct. 1994), pp. 70-79.

* cited by examiner

*Primary Examiner* — Kambiz Zand
*Assistant Examiner* — Dant Shaifer Harriman
(74) *Attorney, Agent, or Firm* — Brake Hughes Bellermann LLP

(57) ABSTRACT

Embodiments include a system for processing logical clock values according to a secure maximum operation. The system may include a communication unit and a processing unit. The communication unit may be configured to receive an encrypted first value of a logical clock, send an encrypted blinded difference, receive an encrypted blinded maximum value, and receive a maximum value. The processing unit may be configured to access an encrypted second value of the logical clock, generate the encrypted blinded difference between the first value and the second value, provide an encrypted blinded first value and an encrypted blinded second value in an oblivious transfer protocol, and generate an encrypted maximum value from the encrypted blinded maximum value.

40 Claims, 11 Drawing Sheets

SECURE LOGICAL VECTOR CLOCKS

CROSS-REFERENCE TO RELATED APPLICATION

This application claims priority under 35 U.S.C. §119 to U.S. Provisional Patent Application No. 61/119,342, filed Dec. 2, 2008, titled "Secure Logical Vector Clocks," and claims priority to EP Application 07018987.3, filed Sep. 27, 2007, both of which are incorporated herein by reference in their entirety.

TECHNICAL FIELD

Embodiments relate generally to the field of electronic data processing and more specifically to secure computation protocols.

BACKGROUND AND PRIOR ART

A distributed system may be a collection of systems that interact with each other. Each system of a distributed system may run or host a process that communicates with other processes of the distributed system. Communication may include sending and receiving messages, for example, asynchronous or synchronous messages.

Logical vector clocks may be used to determine a causal relation between events of two different processes. A causal relation may be that one event caused the other event because the one event was processed prior to the other event and was in a position to directly or indirectly influence the other event. Vector clocks of a distributed system may be described as values each of which may be increased by a process of the distributed system. In an example, a process may increase a value by a fixed value when an event is processed by the process. The values may be communicated with messages that are exchanged between processes. Furthermore, a process may update a value with a greater value or provide accessible values for a comparison with values accessible to a different process. Logical vector clocks may, for example, be used by systems of different companies or by different systems within one company.

Values of logical vector clocks and changes of the values may reveal processing details of a distributed system. Such details may for example reveal a part of the history of a process. This may include an identification of processes contributing to an event and the sequence in which the processes contributed.

In an example scenario, a first event may be a creation of a purchase request by a purchaser. The purchase announcement may be sent to a first vendor and the process of the first vendor may send a reply without an offer. Following this, the purchase request may be sent to a second vendor. The second vendor may be able to see from the values of logical clocks received with the request that the request was first sent to the first vendor.

SUMMARY

Embodiments may be used to address logical vector clocks that preserve a certain level of privacy of values of the logical vector clocks. Such logical vector clocks may be secure vector clocks. Secure vector clocks may be used to determine if an event caused a different event.

An embodiment includes a first system for processing values of logical clocks. More specifically, the first system may address how to identify a maximum value of a logical vector clock without gaining knowledge about the maximum value. For this, the first system may process encrypted values of a logical clock to identify a maximum value within the different values. The maximum value may be identified by exchanging encrypted values with a further system according to an embodiment. With a certain level of security, the first system may not be able to gain knowledge of the maximum value or the different values. Furthermore, the first system may participate in additional operations of secure vector clocks such as incrementing a value of a logical clock or comparing values of a logical clock. With a certain level of security, the first system may not be able to gain knowledge of the processed values through the additional operations.

The first system may provide a high level of security because secure computation techniques may be used with proven security levels. The first system may be efficient because the secure computation techniques may use fast computations, have low memory requirements, and low communication overhead costs. Furthermore, the first system may be easy to implement and to update to new standards because hardware based secure computation techniques may not be required. Therefore, an exchange of central processing units or of communication units may not be required.

A further embodiment includes a second system for participating in a processing of logical clock values. More specifically, the second system may address how to participate in an identification of a maximum value of a logical vector clock without gaining knowledge about the maximum value. For this, the second system may process values in collaboration with the first system. The second system may not be able to gain knowledge about the maximum value. Furthermore, the second system may participate in additional operations of secure vector clocks without being able to gain knowledge about one or more of the processed values.

The second system may provide a high level of security and be efficient because secure computation techniques may be used. Furthermore, the second system may be easy to implement and update.

A further embodiment may include a third system for comparing values of logical clocks. More specifically, the third system may address how to compare values of logical vector clocks without gaining knowledge about the compared values. A result of such a comparison may be that one event caused a different event according to the values of the logical vector clocks. For this, the third system may collaborate with the first system and the second system by exchanging encrypted values.

The third system may provide a high level of security and be efficient because secure computation techniques may be used. Furthermore, the third system may be easy to implement and update.

Further embodiments include: a first method addressing a situation that may be addressed by the first system and including operations that correspond to features of the first system, a second method addressing a situation that may be addressed by the second system and including operations that correspond to features of the second system, and a third method addressing a situation that may be addressed by the third system and including operations that correspond to features of the third system.

Accordingly, the first method, the second method, and the third method may provide a high level of security, be efficient, and be easy to implement and update.

Still further embodiments include: a first computer program product addressing a situation that may be addressed by the first method and including features that correspond to features of the first method, a second computer program product addressing a situation that may be addressed by the second method and including features that correspond to features of the second method, and a third computer program product addressing a situation that may be addressed by the third method and including features that correspond to features of the third method.

Accordingly, the first computer program product, the second computer program product, and the third computer program product may provide a high level of security, be efficient, and be easy to distribute initially and with updates.

DETAILED DESCRIPTION

The following description of examples includes details for illustrating embodiments and is not intended to limit the scope of the embodiments or to be exhaustive. For purposes of explanation, specific details are set forth in order to provide a thorough understanding of example embodiments. A person skilled in the art may appreciate that further embodiments may be practiced with details that differ from the specific details.

Figure 1:
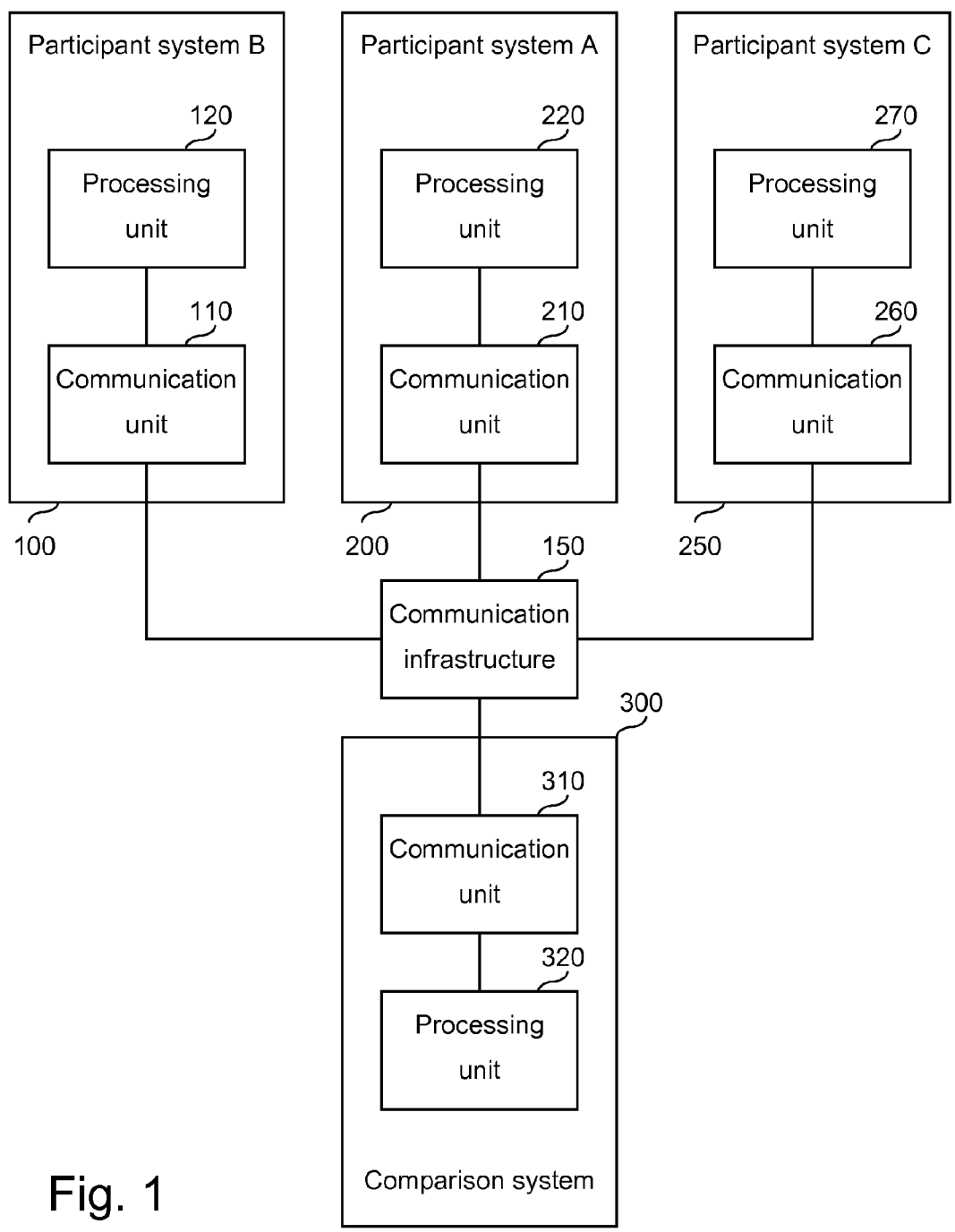
FIG. 1 is a block diagram of coupled example systems according to embodiments.

FIG. 1 is a block diagram of coupled example systems according to embodiments. The example systems include a participant system B 100 with a communication unit 110 and a processing unit 120, a participant system A 200 with a communication unit 210 and a processing unit 220, a participant system C 250 with a communication unit 260 and a processing unit 270, and a comparison system 300 with a communication unit 310 and a processing unit 320. The example systems are communicatively coupled by a communication infrastructure 150.

The participant system B 100 may be used for processing logical clock values and the participant system A 200 may be used for participating in a processing of logical clock values. For this, data may be exchanged between the participant system B 100 and the participant system A 200 according to a protocol. The protocol may depend on the type of processing of the logical clock values. According to a protocol, the two participant systems may have different roles: in an example scenario, the participant system B 100 may process values of a logical clock and the participant system A 200 may participate in the processing; in a further example scenario, the participant system A 200 may process values of a logical clock and the participant system B 100 may participate in the processing.

In an example, the participant system C 250 may be also used for participating in a processing of logical clock values in collaboration with the participant system B 100. In a further example, still more participant systems may be used for exchanging data according to embodiments by following protocols.

In an example, the participant systems may be a distributed system and each participant system may host or run a process that communicates with the processes of the other participant systems. Each participant system may be assigned to a logical clock and each clock may count the events of a process of a participant system. A clock may be identified with such a counting of events by one process and vector clocks may be identified with independent counting of events by different processes. A set of values of the different clocks may be understood as a vector and each process may maintain its own vector according to implemented rules of vector clocks. At some point of time, vectors with different values from different processes may be compared to establish a causal relation between events. Different operations may be required to maintain the values of a vector clock and to compare the values and some of the operations may leak information about past events.

In a secure vector clock environment, operations may be modified so that they may not leak information about past events. A person skilled in the art may appreciate that standard vector clocks may use rules known in the art.

According to rules of vector clocks, an increment operation may be executed to count the events of a process by increasing a value of a logical clock by a fixed value.

According to rules of vector clocks, a maximum operation may be executed to determine the maximum value of two different values of the same clock. The maximum operation may be executed when a message with the one of the values is received by a process. The process may have the other value of the clock from a prior event, for example, from an internal event or from a previously received message. According to the rules of vector clocks, the determined maximum value may be used for counting following events.

According to rules of vector clocks, a comparison operation may include comparing values of clocks maintained by different processes. In an example, the comparison operation may include using a comparison system according to embodiments. In a different example, the comparison system may have a role of a trusted party and each participant system may send the maintained values of clocks to the comparison system. In such a case, the values may be sent in a decrypted format or in an encrypted format in which case the comparison system may have to initiate a decryption of the values.

Compared to vector clocks, secure vector clocks may include using a secure increment operation, a secure maximum operation, or a secure comparison operation. Such secure operations may correspond to operations of standard vector clocks but may include different operation steps. Furthermore, the roles of the participant systems in protocols that are in accordance with embodiments may be interchanged. In an example scenario, the participant system B 100 may be used for processing logical clock values to obtain a maximum value and the participant system A 200 may be used for participating in obtaining the maximum value. In a further example scenario, the participant system A 200 may be used to obtain a maximum value and the participant system B 100 may be used for participating in obtaining the maximum value. Different scenarios may be depend on which participation system sends a message to which different participation system and different scenarios may happen at different times.

The participant system B 100 may include as hardware a computer system, for example, a personal computer (PC), a server, a plurality of servers configured to execute software programs, or a mainframe computer system. The participant system B 100 may include a client and a server related according to a client server architecture or may include one or more computers arranged in a peer-to-peer architecture or a distributed architecture. In a further example, the participant system B 100 may include a plurality of individual computer systems that are connected by the Internet or by an intranet of an entity such as for example a company or an organization.

The hardware of the participant system B 100 may run, for example by hosting and executing, a software program that configures the participant system B 100 to have features according to an embodiment. Components or units of the participant system B 100 may include software units that represent encapsulated or distributed instructions. Such software units may be executed by the hardware of the participant system B 100 and execution may provide features of the units according to an embodiment. Furthermore, units of the participant system B 100 may include coding pieces that are organized in a way that is different from the units. In an example, coding pieces of one unit may be a part of different coding modules such as function modules or classes. In a further example, coding pieces of different units may be a part of an identical coding module. One or more units of the participant system B 100 may be designed as Web applications.

The participant system A 200 may be embodied by a computer system that may be identical to, similar to, or different from the hardware of the participant system B 100. The same may be true for the comparison system 3 250 or the comparison system 300. In an example, the participant system B 100 may be part of a computer system that hosts also the participant system A 200 or the participant system C 250. In a further example, the further participant system A 200 may be a separate computer system different from the participant system B 100.

The communication infrastructure 150 may for example be the Internet or an intranet of an organization or a group of organizations.

In a following figure, example scenarios of logical vector clocks are described and in a further following figure example scenarios of secure logical vector clocks according to embodiments are described.

Figure 2:
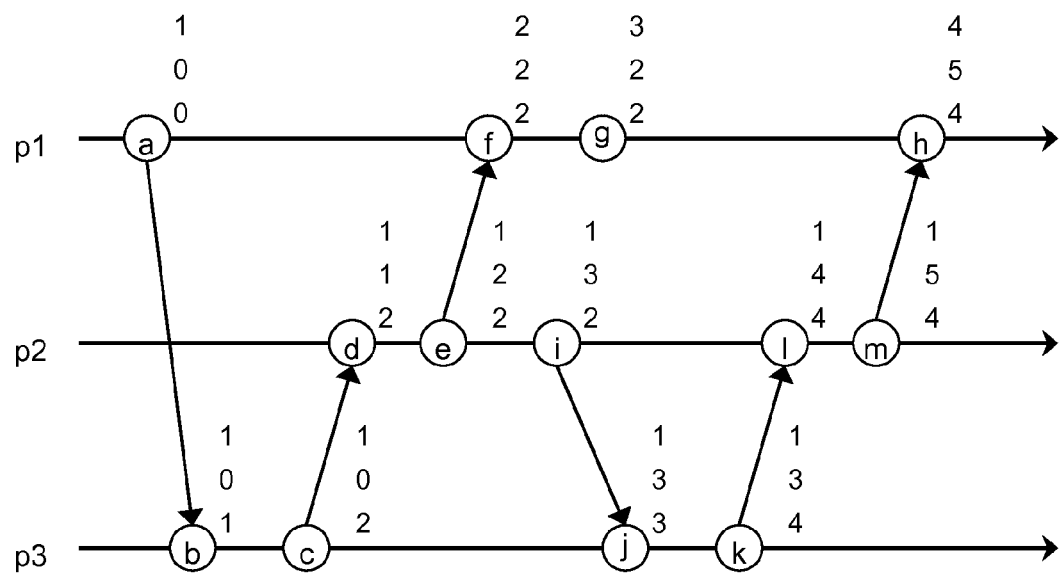
FIG. 2 is a diagram of events of three example processes and values of logical clocks.

FIG. 2 is a diagram of events of three example processes and values of logical clocks. The three processes p1, p2, and p3 have timelines along which events "a", "b", "c", "d", "e", "f", "g", "h", "i", "j", "k", "l", and "m" are specified. Each event has a vector of values of clocks. The values may be maintained by the process to which the corresponding timeline belongs. In an example, a process may maintain a value by increasing a value or by substituting a value by a greater maximum value. In an example, first values of the vectors may be increased by the process p1, second values of the vectors may be increased by the process p2, and third values of the vectors may be increased by the process p3. Consecutive events may be on one timeline representing an internal processing related to the events. Consecutive events may be connected by an arrow representing events related to exchanging a message between processes.

Event "a" may include sending a message from process p1 to process p2. Event "a" may have values of logical clocks that are represented by vector (1 0 0). According to the vector, the clock assigned to process p1 has value 1, the clock assigned to process p2 has value 0, and the clock assigned to process p3 has value 0. Process p1 may send the vector (1 0 0) together with a message to process p2. Event "b" may include p2 receiving the message from process p1 and accordingly p2 may execute an increment operation to obtain the values (1 0 1). Accordingly, the clock assigned to process p1 has value 1, the clock assigned to process p2 has value 0, and the clock assigned to process p3 has increased to value 1. In following events, the responsible process executes an increment operation for the value of the clock that is assigned to the process. In an example, each value may be increased by a fixed amount, such as one unit. In a further example, different clocks may increase the values by different fixed amounts or by different varying amounts.

Event "f" may represent that process p1 receives a message from process p1. Accordingly, an increment operation may be executed for the first value based on the most recent internal event, that is, event "a". However, maximum operations may be executed to update the second value and the third value of the vector. A maximum operation may include comparing the second value of the vector from the most recent internal event "a" and the second value of the vector received with the message, that is, vector of event "e". According to the comparison, the maximum value of the values of the second clock for the vector of event "f". In a further maximum operation, the third value of the vector of event "a" may be compared to the third value of the vector of event "e" and the greater one of the values may be used as the maximum value of the third clock.

A comparison of vectors according to a comparison operation may allow for identifying causal relations between events. In an example comparison, all values of event "d" are greater than or equal to the corresponding values of event "a" or "b". This may be defined as a causal relation according to which event "a" or "b" caused event "d". In a further example comparison, event "g" has a value of the first clock that is greater than the value of the first clock of event "j" but the second and third value of event "g" are less than the corresponding values of event "j". Accordingly, a causal relation may not be established and event "g" and event "j" may be defined as concurrent.

Figure 3:
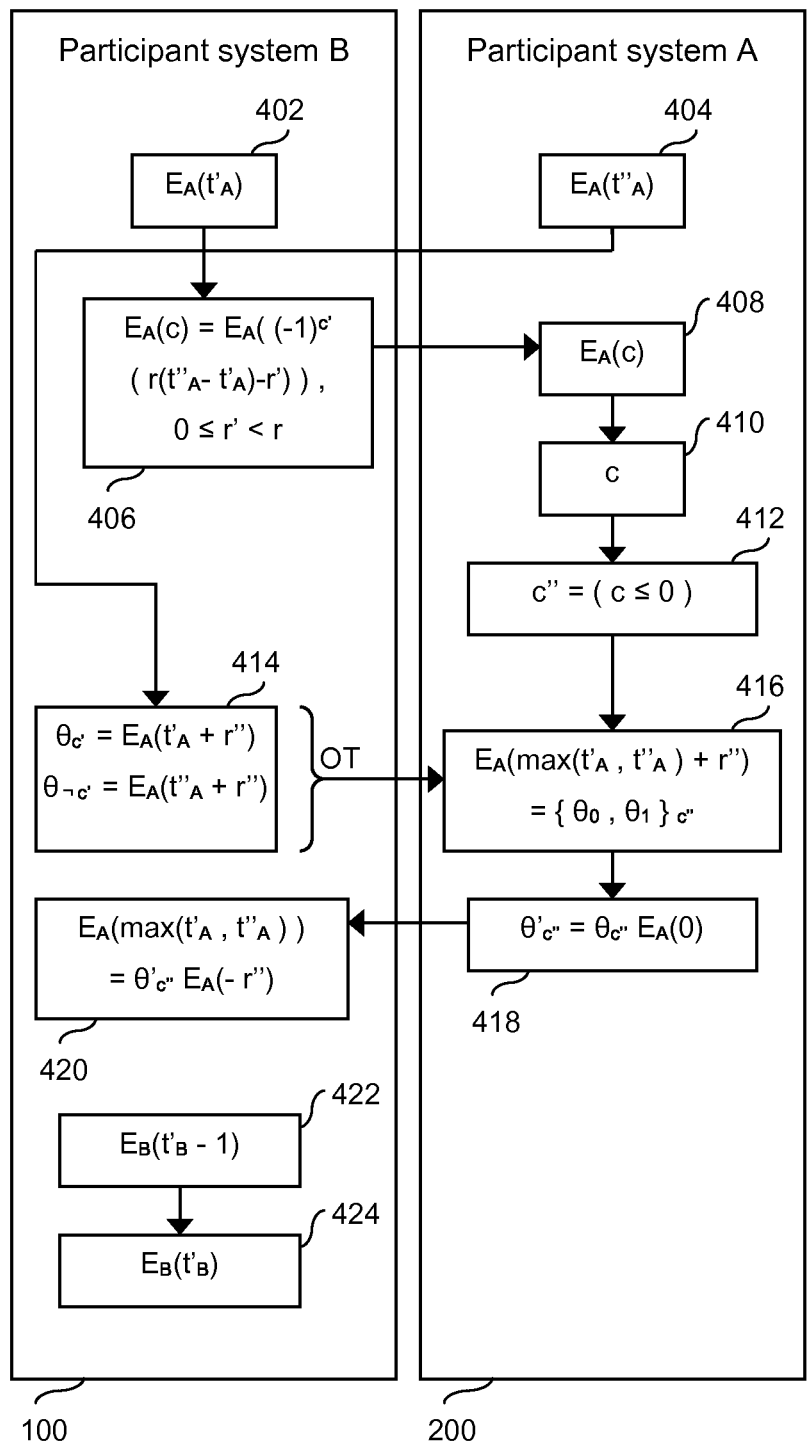
FIG. 3 is a block diagram of example values processed and exchanged according to embodiments.

FIG. 3 is a block diagram of example values processed and exchanged according to embodiments. The participant system B 100 may access or process values 402, 406, 414, 420, 422, and 424. The participant system A 200 may access or process values 404, 408, 410, 412, 416, and 418. A secure maximum operation may be executed according to a protocol for the participant system B 100 and the participant system A 200.

The processing unit 120 of participant system B 100 may be configured to access an encrypted second value 402 $E_A$ ($t'_A$) of a logical clock. The encrypted second value 402 of the logical clock may be computable with a homomorphic encryption function $E_A$ and the public key from a second value t'A of the logical clock. The logical clock may be assigned to a process of the participant system A 200 as is indicated by index "A". The encryption function $E_A$ may be a public key encryption system and the public key may be accessible or known to each one of the participant systems and the comparison system. However, the private key related to the public key by being configured to decrypt encrypted values may be accessible only to the participant system A 200 as is indicated by index "A". In a similar way, values of a further logical clock that may be assigned to a process of the participant system B 100 are indicated by index "B". Also, an encryption function of which the private key related to the known public key may be accessible only to the participant system B 100 as is indicated by index "B".

The encrypted second value 402 $E_A$ ($t'_A$) may be computable by encrypting $t'_A$. However, the encrypted second value 402 may have been computed without encrypting $t'_A$. In an example, the encrypted second value 402 may have been a result of a prior maximum operation that may not require an encryption computation. In a further example, the encrypted second value 402 may have been received from the participant system A 200. The participant system A 200 may have the processing unit 220 that is configured to generate the encrypted second value 402 that is identical to an encrypted incremented previous second value encrypted with the homomorphic encryption function $E_A$. In an example, an encrypted previous second value may be used to generate the encrypted incremented previous second value by incrementing the argument of the encrypted previous second value without a decryption and an encryption. For this, it may be used that the encryption function $E_A$ is homomorphic. However, in a further example, the encrypted second value 402 may have been computed by decrypting a previous value, increment the previous value, and encrypt the incremented previous value.

For a homomorphic encryption function E it is true E (x) E (y)=E (x+y). According to this characteristic, an encrypted value may be modified without decrypting the encrypted value. Examples of homomorphic encryption functions are Paillier encryption systems, modifications thereof, or Naccache-Stern encryption systems. In an example, the homomorphic encryption function may be a semantically secure homomorphic encryption function. A semantic security may be achieved by randomizing an encryption so that an original value may result in different, encrypted values. The different, encrypted values may be decrypted to give the original value. However, a semantically secure homomorphic encryption function may be secure against guessing of an original value by encrypting test values and comparing the encrypted test values to the encrypted original value. In an example, the encryption functions used by the participant system A 100, the participant system B 100, and the participant system C 250 may use semantically secure homomorphic encryption functions. Further participant systems may also use semantically secure homomorphic encryption functions. In a further example, homomorphic encryption functions used by the participant systems or a part of the participant systems may not be semantically secure.

The communication unit 210 of the participant system A 200 may be configured to send an encrypted first value 404 of the logical clock to the participant system B 100. The logical clock may be assigned to the participant system A 200. Accordingly, the communication unit 110 of the participant system B 100 may be configured to receive the encrypted first value 404 of the logical clock. The encrypted first value 404 may be computable with a homomorphic encryption function and a public key from a first value of the logical clock. In an example scenario, the encrypted first value 404 may be sent as a part of a vector and the vector may include values of a further logical clocks. In such an example, the vector may include an encrypted first value of an assigned logical clock that may be identical with $E_B$ (0). Such a value may be used because the participant system may use an encrypted second value of an assigned logical clock, $E_B$ ($t'_B$), for counting following events.

In a further example, the encrypted first value 404 may be received with a message from a participant system that is different from the participant system A 200, for example, from the participant system C 250. In such a case, the encrypted first value 404 may have originated from the participant system A 200 but may have been sent to one or more participant systems that are different from the participant system B 100 prior to reaching the participant system B 100. Independently from which system the participant system B 100 received the encrypted first value 404, following operations may still be executed between the participant system B 100 and the participant system A 200.

The processing unit 120 of the participant system B 100 may be configured to generate the encrypted blinded difference 406 between the first value and the second value. A blinded difference 410 may be computable from an intermediate result. However, a computation of the intermediate result and an encryption of the intermediate result may not be required using the homomorphy characteristic of the encryption function $E_A$. Also, a decryption of the encrypted second value 402 and the encrypted first value 404 may not be required. In an example, the encrypted blinded difference 406 may be computed by $E_A(c)=E_A((-1)^{c'}(r(t''_A-t'_A)-r'))=((E_A(t''_A)/E_A(t'_A))^r/E_A(r'))**((-1)^{c'})$. Accordingly, the intermediate result may be computable by multiplying a difference between the first value and the second value with a first blinding value "r" and by subtracting a second blinding value "r'". In an example, the first blinding value and the second blinding value may be random values that have been determined by a pseudo-random number generator. In a different example, the first blinding value may be selected to be equal to one and the second blinding may be selected to be equal to zero. Such a selection of the first blinding value and the second blinding value may also be used for further blinded differences that may be used in following operations. In an example, the first blinding value may be required to be greater than the second blinding value and the second blinding value may required to be greater than or equal to zero. As a person skilled in the art may appreciate, a random first blinding value and a random second blinding value may be computed according to such restrictions. Such a determination of random blinding values may also be used for further blinded differences that may be used in following operations. A sign of the intermediate result may be changed according to a first split value "c'". The first split value "c'" and a second split value "c''" may determine if the first value is less than or equal to the second value.

In an example, the first split value "c'" and the second split value "c''" may bit values. The second split value may be obtained later according to a comparison result. The first split value "c'" and the second split value "c''" may be combined with an exclusive-or relation, that is, $c' \oplus c''$. The combined first split value "c'" and the second split value "c''" may be equal to the result that the blinded difference 410 is less than or equal to zero and equivalently that the first value is less than or equal to the second value. Equality may mean that a zero bit means untrue and a one bit means true: $c' \oplus c''=(t''_A \leq t'_A)$. Such a relation may also be expressed by: $c' \oplus c'' \Leftrightarrow (t''_A \leq t'_A)$.

Generally, for equalities or inequalities rounding errors may be taken into account by using error values that are added or subtracted from values that are processed in equalities or inequalities. A person skilled in the art may appreciate that different possibilities exist for treating rounding errors.

The communication unit 110 may be configured to send the encrypted blinded difference 406 to the participant system A 200. Accordingly, the communication unit 210 of the participant system A 200 may be configured to receive the values as the encrypted blinded difference 408.

The processing unit 220 may be configured to generate the blinded difference 410 by decrypting the encrypted blinded difference 408 with a private key. The processing unit 220 may be configured to compute the second split value 412 by evaluating if the blinded difference 410 is less than or equal to zero. Computing the second split value 412 may include setting the second split value 412 equal to one when the blinded difference 410 is less than or equal to zero and setting the second split value 412 equal to zero when the blinded difference 410 is not less than or equal to zero.

The processing unit 120 of the participant system B 100 may be configured to provide values 414 including an encrypted blinded first value and an encrypted blinded second value in an oblivious transfer protocol to the participant system A 200. The blinded first value may be computable by adding a third blinding value to the first value and the blinded second value may be computable by adding the third blinding value to the second value. The third blinding value may be a random value that has been determined by a pseudo-random number generator. In an example, the communication unit 110 may also contribute to the oblivious transfer protocol.

In an example, the modulus of a domain of the homomorphic encryption function may be public and the third blinding value may be uniformly determined within the domain of the homomorphic encryption function. Therefore, the third blinding value may be more secure against guessing. A homomorphic encryption function with a public modulus of the domain may, for example, be a Naccache-Stern encryption system.

The participant system B 100 and the participant system A 200 may participate in an oblivious transfer according to, for example, S. Even and others or M. Naor and B. Pinkas. Generally, in an oblivious transfer a first party may provide two or more values to a second party. The second party may select one of the provided values without getting to know the other provided values and without the first party getting to know which value has been selected. For participation in the oblivious transfer, the encrypted blinded first value may be identifiable by an index equal to the first split value "c'" and the encrypted blinded second value may be identifiable by an index equal to the second split value "c''".

The processing unit 220 of the participant system A 200 may be configured to identify the encrypted blinded maximum value 418. This may be done by selecting a value 416 from a set of provided values 414 according to the oblivious transfer protocol. The value 416 may be selected from the provided values 414 using the second split value 412 and the indices of the provided values 414. The selected value may be the value that has an index that is identical to the second split value 412. The set of values 414 may be required to include the encrypted blinded first value and the encrypted blinded second value. In an example, the communication unit 210 may also contribute to the oblivious transfer protocol.

The communication unit 210 of the participant system A 200 may be configured to send the encrypted blinded maximum value 418 to a participant system. In an example, the encrypted blinded maximum value 418 may be identified or generated by multiplying the selected value 416 with an encrypted value of a neutral element of the homomorphic encryption function. In such a way, the participant system A 200 may not be able to identify which one of the provided values has been selected. Further security may be provided when the homomorphic encryption function is semantically secure.

The communication unit 110 of the participant system B 100 may be configured to receive the encrypted blinded maximum value 418. The processing unit 120 may be configured to generate the encrypted maximum value 420 from the encrypted blinded maximum value 418. For this, the blinding may be removed from the encrypted blinded maximum value 418. The encrypted maximum value 420 may then be used as a value related the clock assigned to the participant system A 200 for counting following events.

The identification of the encrypted maximum value 420 may be a result of an execution of an example secure maximum operation. Starting from the encrypted second value 402 and the encrypted first value 404 that may be two different values related to one clock the encrypted maximum value 420 of the one clock is computed. The encrypted second value 402 and the encrypted first value 404 may be from two different vectors related to two different events of the participant system B 100, that is, of a process of the participant system B 100.

The example secure maximum operation may be executed so that the participant system B 100 may not be able to access the first value of the clock or the second value of the clock. This may be so because the first value and the second value are encrypted and the participant system B 100 may not be able to decrypt the first value or the second value. Furthermore, the participant system B 100 may not be able to identify which one of the encrypted second value 402 and the encrypted first value 404 is the maximum value 420.

The example secure maximum operation may be executed so that the participant system A 200 may not be able to access the first value or the second value. Furthermore, the participant system A 200 may not be able to identify which one of the encrypted second value 402 and the encrypted first value 404 is the maximum value 420.

In an example, the participant system B 100 may have values of two vectors from two different events. The number of values in a vector may be two or more corresponding to two or more participant systems in the vector clock system. The participant system B 100 may execute a secure maximum operation according to a protocol with the other participant systems. For this, the participant system B 100 may follow a protocol that corresponds to the protocol used with the participant system A 200. The other participant systems may be selected to execute a secure maximum operation so that the other participant system is able to decrypt a first value and a second value of specific logical clock. This may be the case when the specific logical clock is assigned to the other participant system.

The processing unit 120 may be configured to generate an encrypted second value 424 of an assigned logical clock. The assigned logical clock may be assigned to the participant system B 100 and accordingly the participant system B 100 may be responsible to execute a secure increment operation. According to the secure increment operation, the encrypted second value 424 may be identical to an encrypted incremented previous second value that may be computed from an encrypted previous second value 422. In an example, the encrypted second value 424 may be computed by multiplying the encrypted previous second value 422 with $E_B$ (1) and using the homomorphy characteristic. The encrypted incremented previous second value may be computable with an assigned homomorphic encryption function and an assigned public key. The assigned homomorphic encryption function may be assigned to the participant system B 100 because the participant system B 100 may have access to the private key configured to decrypt values that have been encrypted with the assigned public key. The assigned homomorphic encryption function may be semantically secure and the modulus of a domain of the assigned homomorphic encryption function may be public.

Figure 4A:
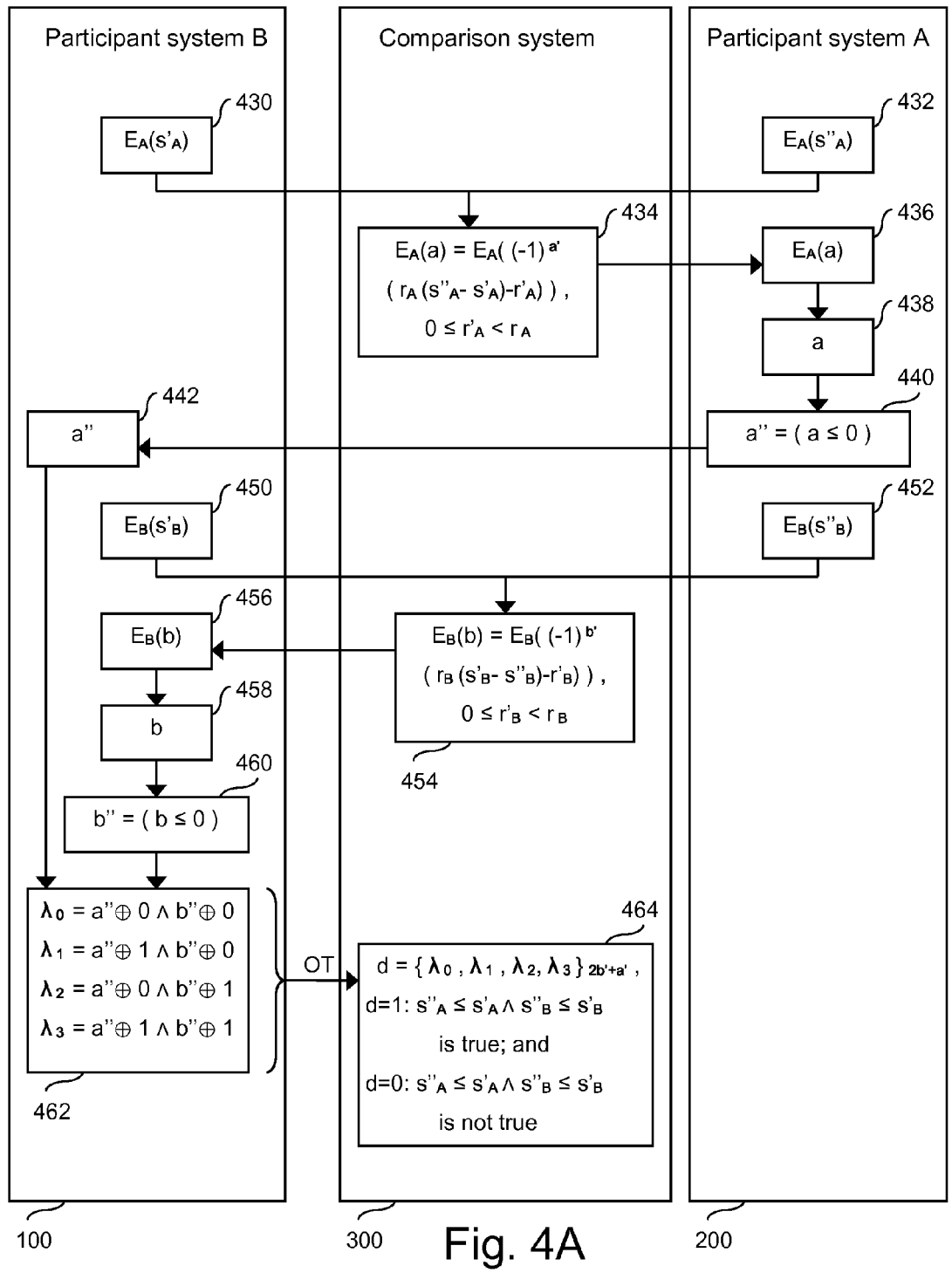
FIG. 4A is a block diagram of further example values processed and exchanged according to embodiments.

FIG. 4A is a block diagram of further example values processed and exchanged according to embodiments. The participant system B 100, the participant system A 200, and the comparison system 300 may execute a secure comparison operation according to a protocol. For this, the participant system B 100 may access or process values 430, 442, 450, 456, 458, 460, and 462. The participant system A 200 may access or process values 432, 436, 438, 440, and 452. The comparison system 300 may access or process values 434, 454, 464.

The communication unit 110 of the participant system B 100 may be configured to send values 430 and 450 related to a current second value of the logical clock and a current second value of the assigned logical clock to the comparison system 300. The logical clock may be assigned to the participant system A 200 and the assigned clock may be assigned to the participant system B 100. In an example, the participant system B 100 may send the values 430 and 450 according to a secure comparison operation. In a different example, the comparison system 300 may be treated as a trusted party so that the comparison system 300 may access values of clocks directly and without being encrypted. In such a case, the participant system B 100 may decrypt the value 450 to generate the current second value of the assigned logical clock and send the current second value of the assigned logical clock to the comparison system 300. Also, the participant system B 100 may also have access to the current second value of the logical clock and send the current second value of the logical clock to the comparison system 300.

The communication unit 210 of the participant system A 200 may be configured to send values 432 and 452 related to a current first value of the logical clock and a current first value of the assigned logical clock to the comparison system 300. In an example, the participant system A 200 may send the values 432 and 452 according to a secure comparison operation. In a different example, the comparison system 300 may be treated as a trusted party also with regards to the participant system A 200. In such a case, the participant system A 200 may decrypt the value 432 to generate the current first value of the logical clock and send the current first value of the logical clock to the comparison system 300. Also, the participant system A 200 may also have access to the current first value of the assigned logical clock and send the current first value of the assigned logical clock to the comparison system 300.

According to a secure comparison operation, the communication unit 110 of the participant system B 100 may be configured to send the encrypted current second value 430 of the logical clock to the comparison system 300. The encrypted current second value 430 may be computable with the homomorphic encryption function and the public key from the current second value of the logical clock. However, using the homomorphy characteristic of the encryption function the encrypted current second value 430 may have been computed differently.

According to a secure comparison operation, the communication unit 210 of the participant system A 200 may be configured to send the encrypted current first value 432 of the logical clock to the comparison system 300. The encrypted current first value 432 may be computable with the homomorphic encryption function and the public key from the current first value of the logical clock. However, using the homomorphy characteristic of the encryption function the encrypted current first value 432 may have been computed differently.

According to a secure comparison operation, the communication unit 310 of the comparison system 300 may be configured to receive the encrypted current second value 430 and the encrypted current first value 432.

The processing unit 320 of the comparison system 300 may be configured to generate an encrypted blinded current difference 434 of the logical clock. The encrypted blinded current difference 434 may be related to the difference between the current first value of the logical clock and the current second value of the logical clock. The blinded current difference may be computable from an intermediate result that may be computed by multiplying a current difference between the current first value of the logical clock and the current second value of the logical clock with a first blinding value and by subtracting a second blinding value. In an example, the blinded current difference may be computed in a different way using the homomorphy characteristic of the encryption function. The absolute value of the first blinding value may be greater than the absolute value of the second blinding value. In an example, the first blinding value may be required to be greater than the second blinding value and the second blinding value may be required to be greater than or equal to zero. A sign of the intermediate result may be changed according to a current first split value "a'". The current first split value "a'" and a current second split value "a''" may determine if the current first value of the logical clock is less than or equal to the current second value of the logical clock. The current second split value "a''" may be computed in following operations. The first blinding value and the second blinding value may be random values determined by a pseudo-random generator within the given constraints.

The communication unit 310 may be configured to send the encrypted blinded current difference 434 of the logical clock to the participant system A 200.

Accordingly, the communication unit 210 of the participant system A 200 may be configured to receive the encrypted blinded current difference 436 of the logical clock. The encrypted blinded current difference 436 may be the difference between the current first value of the logical clock and the current second value of the logical clock and may be identical the sent encrypted blinded current difference 434.

The processing unit 220 of the participant system A 200 may be configured to generate the blinded current difference 438 of the logical clock by decrypting the encrypted blinded current difference 436. For this, the private key that is accessible to the participant system A 200 function may be used.

The processing unit 220 may be configured to compute the further current second split value "a''" 440 by evaluating if the blinded current difference 438 is less than or equal to zero.

The communication unit 210 may be configured to send the further current second split value 440 to the participant system B 100.

Accordingly, the communication unit 110 of the participant system B 100 may be configured to receive a value identical to the further current second split value 442. The further current second split value 442 may be used as input of combinations 462.

According to a further part of a secure comparison operation, the communication unit 110 may be configured to send the encrypted current second value 450 of the assigned logical clock to the comparison system 300. The encrypted current second value 450 may be computable with the assigned homomorphic encryption function and the assigned public key from the current second value of the assigned logical clock. However, using the homomorphy characteristic of the assigned encryption function the encrypted current second value 450 may have been computed differently.

According to a further part of a secure comparison operation, the communication unit 210 may be configured to send the encrypted current first value 452 of the assigned logical clock to the comparison system 300. The encrypted current first value 452 may be computable with the assigned homomorphic encryption function and the assigned public key from the current first value of the assigned logical clock. However, using the homomorphy characteristic of the assigned encryption function the encrypted current first value 452 may have been computed differently.

Accordingly, the communication unit 310 of the comparison system 300 may be configured to receive the values as the encrypted current first value 452 and the encrypted current second value 450.

The processing unit 320 of the comparison system 300 may be configured to generate the encrypted blinded current difference 454 of the assigned logical clock. The encrypted blinded current difference 454 may be related to the difference between the current first value of the assigned logical clock and the current second value of the assigned logical clock. The blinded further current difference may be computable from a further intermediate result. However, using the homomorphy characteristic of the assigned encryption function the blinded further current difference 454 may have been computed differently. The further intermediate result may be computed by multiplying a further current difference between the current first value of the assigned logical clock and the current second value of the assigned logical clock with a further first blinding value and by subtracting a further second blinding value. The absolute value of the further first blinding value may be greater than the absolute value of the further second blinding value. In an example, the further first blinding value may be required to be greater than the further second blinding value and the further second blinding value may be required to be greater than or equal to zero. The further first blinding value and the further second blinding value may be random values or values that may have been computed by a pseudo-random generator. A sign of the further intermediate result may be changed according to a further current first split value "b'''". The further current first split value "b'''" and a further current second split value "b''''" may determine if the current first value of the assigned logical clock is less than or equal to the current second value of the assigned logical clock.

The communication unit 310 may be configured to send the encrypted blinded current difference 454 of the assigned logical clock to the participant system B 100.

Accordingly, the communication unit 110 of the participant system B 100 may be configured to receive the value as the encrypted blinded current difference 456 of the assigned logical clock.

The processing unit 120 may be configured to generate the blinded current difference 458 by decrypting the encrypted blinded current difference 456. For this, the processing unit 120 may use the assigned private key of the assigned homomorphic encryption function.

The processing unit 120 may be configured to compute the current second split value "b''''" 460 by evaluating if the blinded current difference 458 is less than or equal to zero. The current second split value "b''''" 460 may be used for the combinations 462.

The processing unit 120 may be configured to compute the combinations 462 of the current second split value 460 and the further current second split value 442. The combinations 462 may further include possible values of the current first split value and a further current first split value. The used split values and the used possible split values in the combinations 462 may be related using bit representation of the used values and relating them by exclusive-or relations. The combinations may be similar to combinations of an oblivious transfer according to O. Goldreich.

The processing unit 120 may be configured to providing the combinations 462 in an oblivious transfer protocol to the comparison system 300.

The processing unit 320 of the comparison system 300 may be configured to select a value 464 from the combinations 462 in an oblivious transfer protocol according to the current first split value and the further current first split value.

The processing unit 320 may be configured to determine from the value 464 if an event has a causal relation to a further event. In an example, this may mean that the event has caused the further event. The event may be from the participant system A 100 specified by the current first value of the logical clock and the current first value of the assigned logical clock. The further event may be from the further participant system B 200 specified by the current second value of the logical clock and the current second value of the assigned logical clock. The event may have caused the further event when two conditions are fulfilled. The first condition may be that the current first value of the logical clock is less than or equal to the current second value of the logical clock. The second condition may be that the current first value of the assigned logical clock is less than or equal to the current second value of the assigned logical clock. The value 464 may be used to determine if the statement that the event caused the further event is true. When such a causal relation is not true, two possibilities may exist: first, the further event may have caused the event and second, the event and the further event may be concurrent.

Figure 4B:
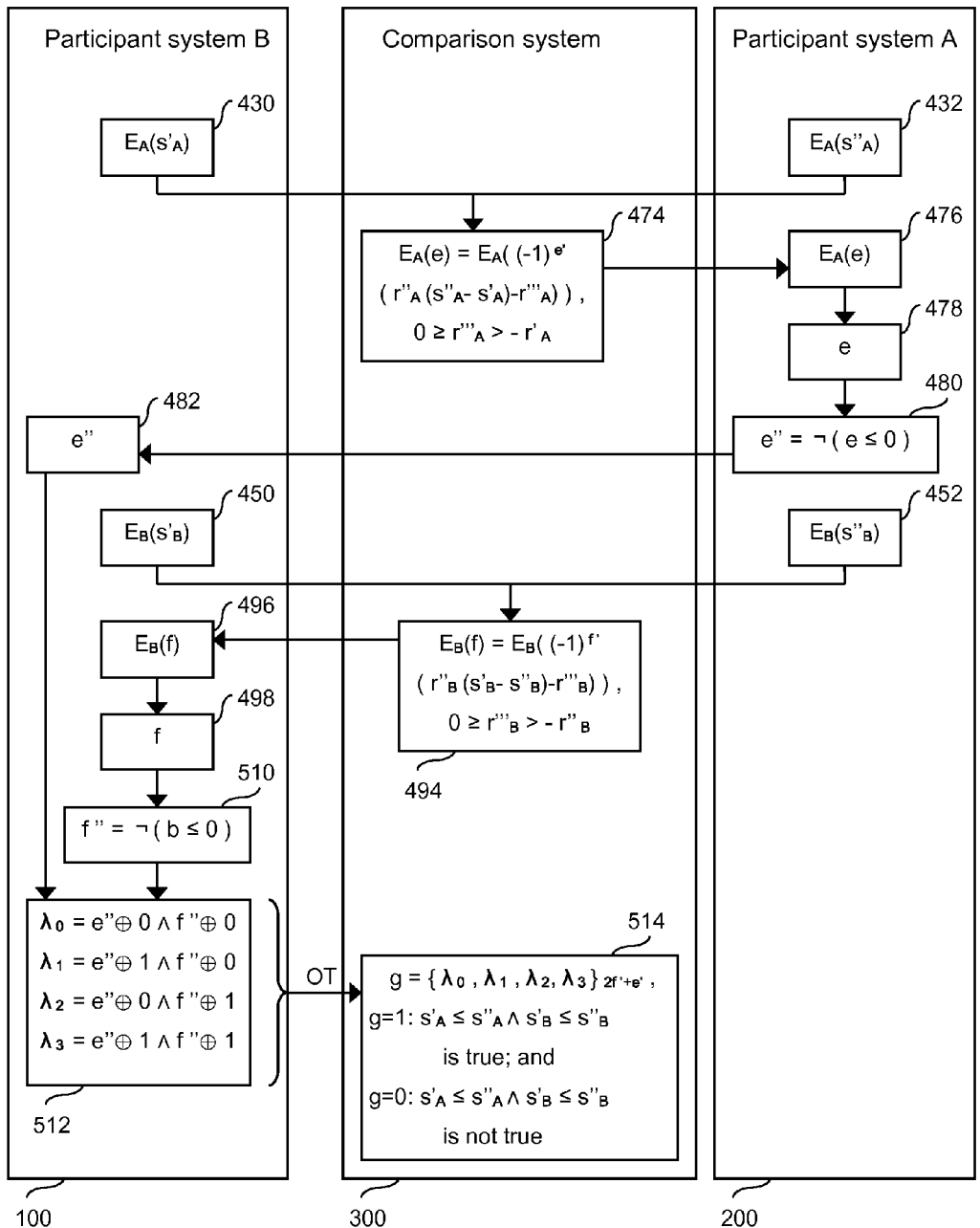
FIG. 4B is a block diagram of further example values processed and exchanged according to embodiments.

FIG. 4B is a block diagram of further example values processed and exchanged according to embodiments. The participant system B 100, the participant system A 200, and the comparison system 300 may execute further part of a secure comparison operation according to a protocol. The further part may be executed when a causal relation between events of the participant system B 100 and the participant system A 200 has been found to be untrue. For the further part, the participant system B 100 may access or process values 430, 482, 450, 496, 498, 510, and 512. The participant system A 200 may access or process values 432, 476, 478, 480, and 452. The comparison system 300 may access or process values 474, 494, 514. Operations executed by the participant system B 100, the participant system A 200, or the comparison system 300 may be identical or similar to corresponding operations described in FIG. 4A.

According to embodiments, the encrypted current second value 430 of the logical clock may be sent from the participant system B 100 to the comparison system 300. The encrypted current first value 432 of the logical clock may be sent from the participant system A 200 to the comparison system 300.

The further encrypted blinded current difference 474 of the logical clock may be generated. The further encrypted blinded current difference 474 may be related to the difference between the current first value of the logical clock and the current second value of the logical clock. The blinded current difference may be computable using a new first blinding value and a new second blinding value. In an example, the blinded current difference may be computed in a different way using the homomorphy characteristic of the encryption function. The absolute value of the new first blinding value may be greater than the absolute value of the new second blinding value. In an example, the negative value of the new first blinding value may be required to be less than the new second blinding value and the new second blinding value may be required to be less than or equal to zero. A sign of the intermediate result may be changed according to a current first split value "e'''". The current first split value "e'''" and a current second split value "e''''" may determine if the current first value of the logical clock is less than or equal to the current second value of the logical clock. The current second split value "e''''" may be computed in following operations. The new first blinding value and new the second blinding value may be random values determined by a pseudo-random generator within the given constraints.

The further encrypted blinded current difference 474 may be sent to the participant system A 200 to be received as the further encrypted blinded current difference 476. The further encrypted blinded current difference 476 may be decrypted to give the further blinded current difference 478. An evaluation if the further blinded current difference 478 is less than or equal to zero may be inverted to give the current second split value "e''''" 480. An inversion may transform a zero-bit to a one-bit and a one-bit to a zero-bit. The current second split value "e''''" 480 may be sent to the participant system B 100 to contribute as the current second split value "e''''" 482 to the combinations 512.

In a further part of the secure comparison operation, the encrypted current second value 450 of the assigned logical clock may be sent from the participant system B 100 to the comparison system 300. The encrypted current first value 452 of the assigned logical clock may be sent from the participant system A 200 to the comparison system 300.

The further encrypted blinded current difference 494 of the assigned logical clock may be generated. The further encrypted blinded current difference 494 may be related to the difference between the current first value of the assigned logical clock and the current second value of the assigned logical clock. The blinded current difference may be computable using a further new first blinding value and a further new second blinding value. In an example, the blinded current difference may be computed in a different way using the homomorphy characteristic of the encryption function. The absolute value of the further new first blinding value may be greater than the absolute value of the further new second blinding value. In an example, the negative value of the further new first blinding value may be required to be less than the further new second blinding value and the further new second blinding value may be required to be less than or equal to zero. A sign of the intermediate result may be changed according to a current first split value "f'". The current first split value "f'" and a current second split value "f'''" may determine if the current first value of the assigned logical clock is less than or equal to the current second value of the assigned logical clock. The current second split value "f'''" may be computed in following operations. The further new first blinding value and further new the second blinding value may be random values determined by a pseudo-random generator within the given constraints.

The further encrypted blinded current difference 494 of the assigned logical clock may be sent to the participant system B100 to be received as the further encrypted blinded current difference 496. The further encrypted blinded current difference 496 may be decrypted to give the further blinded current difference 498 of the assigned logical clock. An evaluation if the further blinded current difference 478 is less than or equal to zero may be inverted to give the current second split value "f'''" 510. The current second split value "f'''" 510 may contribute to the combinations 512.

The combinations 512 may combine the current second split value "f'''" 510, the further current second split value "e''''" 482, and possible values of the current first split value "f" and the further current first split value "e'''". The combinations 512 may be provide in an oblivious transfer protocol to the comparison system 300. The value 514 may be selected from the combinations 462 in the oblivious transfer according to the current first split value "f" and the further current first split value "e'".

According to the value 514, it may be determined if the further event has a causal relation to the event. In an example, this may mean that the further event has caused the event. The event may be from the participant system A 100 specified by the current first value of the logical clock and the current first value of the assigned logical clock. The further event may be from the further participant system B 200 specified by the current second value of the logical clock and the current second value of the assigned logical clock. The further event may have caused the event when two conditions are fulfilled. The first condition may be that the current second value of the logical clock is less than or equal to the current first value of the logical clock. The second condition may be that the current second value of the assigned logical clock is less than or equal to the current first value of the assigned logical clock. The value 514 may be used to determine if the statement that the further event caused the event is true. When such a causal relation is not true, there may be one possibility left: the event and the further event may be concurrent. With such a result of a part of a secure comparison operation a secure comparison operation may be executed. In a further example, the secure comparison operation may include only a part described in FIG. 4A.

In case of comparing vector clock values from more than two participant systems, the secure comparison operation may be repeated. For this, the first value and the second value of a further assigned vector clock from two events may be processed. The processing may correspond to operations executed with the first value and the second value of the logical clock or the assigned logical clock. In an example, the first and second value of the further assigned clock may be compared first with the first and second value of the logical clock. Following this, the first and second value of the further assigned clock may be compared first with the first and second value of the assigned logical clock. For many different logical clocks, first values and second values of two different logical clocks may be compared pair-wise. Results of the pair-wise comparisons may be combined to see if, for example, clock values of one event are all less than or equal to clock values of a second event.

Figure 5A:
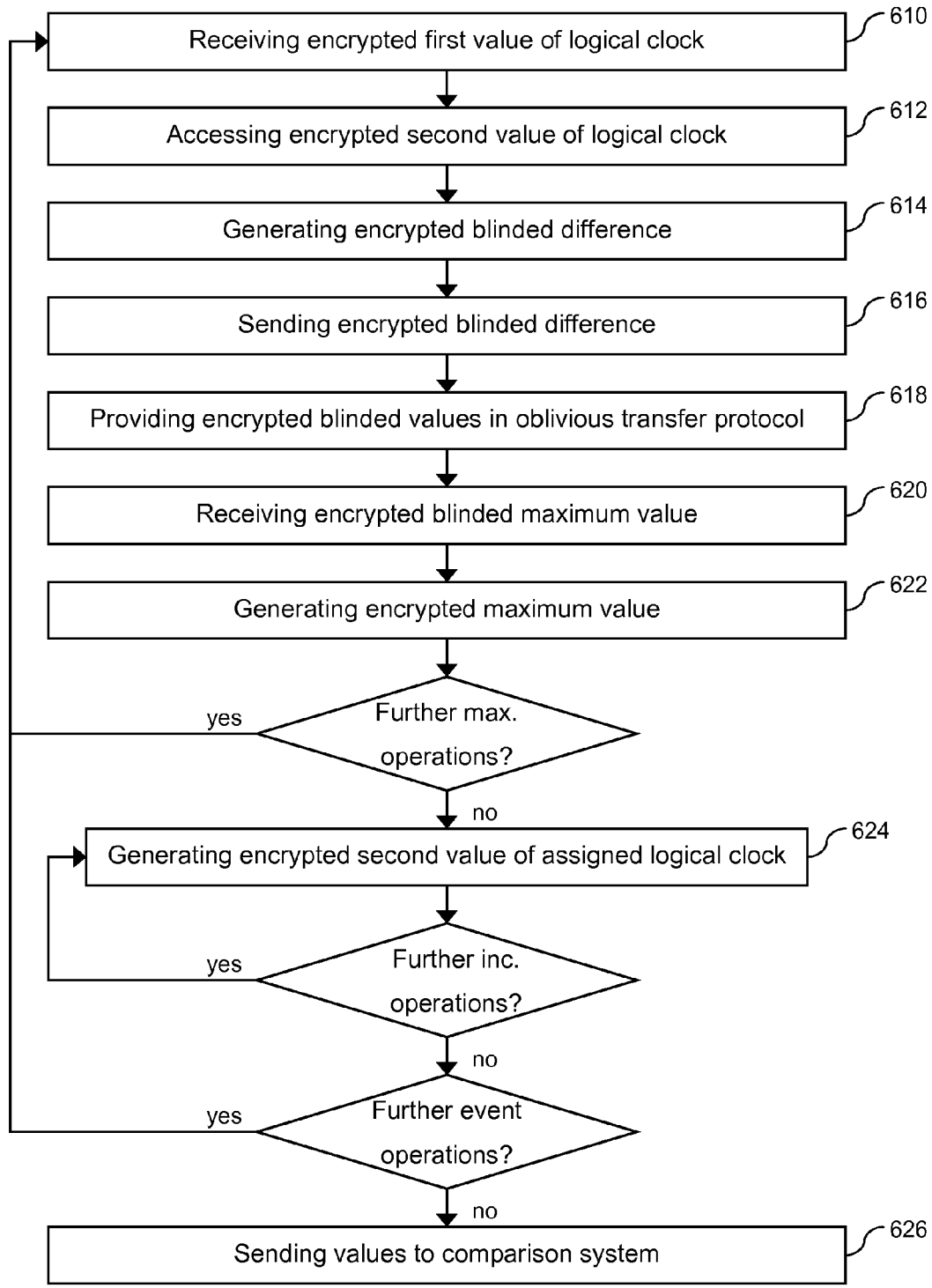
FIG. 5A is a flow diagram of operations of an example method according to an embodiment.

FIG. 5A is a flow diagram of operations of an example method 600 according to an embodiment. The example method 600 may be a computer-implemented method for processing logical clock values. In an example, the method 600 may be used by a system to determine which one of two possible clock values may be the maximum value. This may be done according to a secure maximum operation in order to protect clock values as private or confidential data.

Operations of the method 600 that are independent of further operations of the method 600 may be executed in an order that is different from the order specified in FIG. 5A. In an example, an operation may be independent of a further operation when the operation is not required to provide data to the further operation and does not require data from the further operation. Such different orders may also be applicable to following flow diagrams.

An operation of the method 600 may include receiving 610 an encrypted first value of a logical clock. The encrypted first value of the logical clock may be computable with a homomorphic encryption function and a public key from a first value of the logical clock. In an example, the homomorphic encryption function may be a semantically secure homomorphic encryption function.

Accessing 612 an encrypted second value of the logical clock may follow. The encrypted second value of the logical clock may be computable with the homomorphic encryption function and the public key from a second value of the logical clock.

Generating 614 an encrypted blinded difference between the first value and the second value may follow. The blinded difference may be computable from an intermediate result computed by multiplying a difference between the first value and the second value with a first blinding value and by subtracting a second blinding value. The first blinding value may be greater than the second blinding value and the second blinding value may be greater than or equal to zero. According to such constraints, the first blinding value and the second blinding value may be random values. A sign of the intermediate result may be changed according to a first split value. The first split value and a second split value may determine if the first value is less than or equal to the second value.

Sending 616 the encrypted blinded difference to a participant system may follow.

An operation of the method 600 may include providing 618 an encrypted blinded first value and an encrypted blinded second value in an oblivious transfer protocol to the participant system. The blinded first value may be computable by adding a third blinding value to the first value. In an example, the third blinding value may be a random value. Furthermore, the homomorphic encryption function may be of such a type, that a modulus of a domain of the homomorphic encryption function may be public. In such a case, the third blinding value may be uniformly determined within the domain of the homomorphic encryption function. The blinded second value may be computable by adding the third blinding value to the second value.

Following operations may include receiving 620 an encrypted blinded maximum value and generating 622 an encrypted maximum value from the encrypted blinded maximum value. The maximum value may be identical to the maximum of the first value and the second value. In an example, the encrypted blinded maximum value may be computed by multiplying a value selected in the oblivious transfer protocol with an encrypted value of a neutral element of the homomorphic encryption function.

According to an embodiment, the secure maximum operation to which operations 610 to 622 of the method 600 contribute may be completed. In an example, the method 600 may include operations of further secure maximum operations. For this, the method 600 may include repeating the operations 610 to 622 as long as a first value and a second value of a logical clock from the same different events have to be processed. In a specific example of a distributed system, ten participant systems may each have a logical clock and a vector includes ten values. Accordingly, one of the participant systems may have to execute operations of a secure maximum operation nine times, each time with one of the nine other participant systems.

The method 600 may include generating 624 an encrypted value of an assigned logical clock. The encrypted value of the assigned logical clock may be identical to an encrypted incremented previous value of the assigned logical clock. For the encryption, the assigned homomorphic encryption function and an assigned public key may be used. This may be an example of a secure increment operation. Generating 624 the encrypted value may also be executed prior to or during any one of the executed maximum operations.

The described secure maximum operations and secure increment operations may be executed many times during a processing of data reflecting a creation of many events.

At one point of time, a comparison operation may be executed to determine if a causal relation between two different events exist. For this, the method 600 may include sending 626 values related to a current second value of the logical clock and a current second value of the assigned logical clock to a comparison system 300.

Figure 5B:
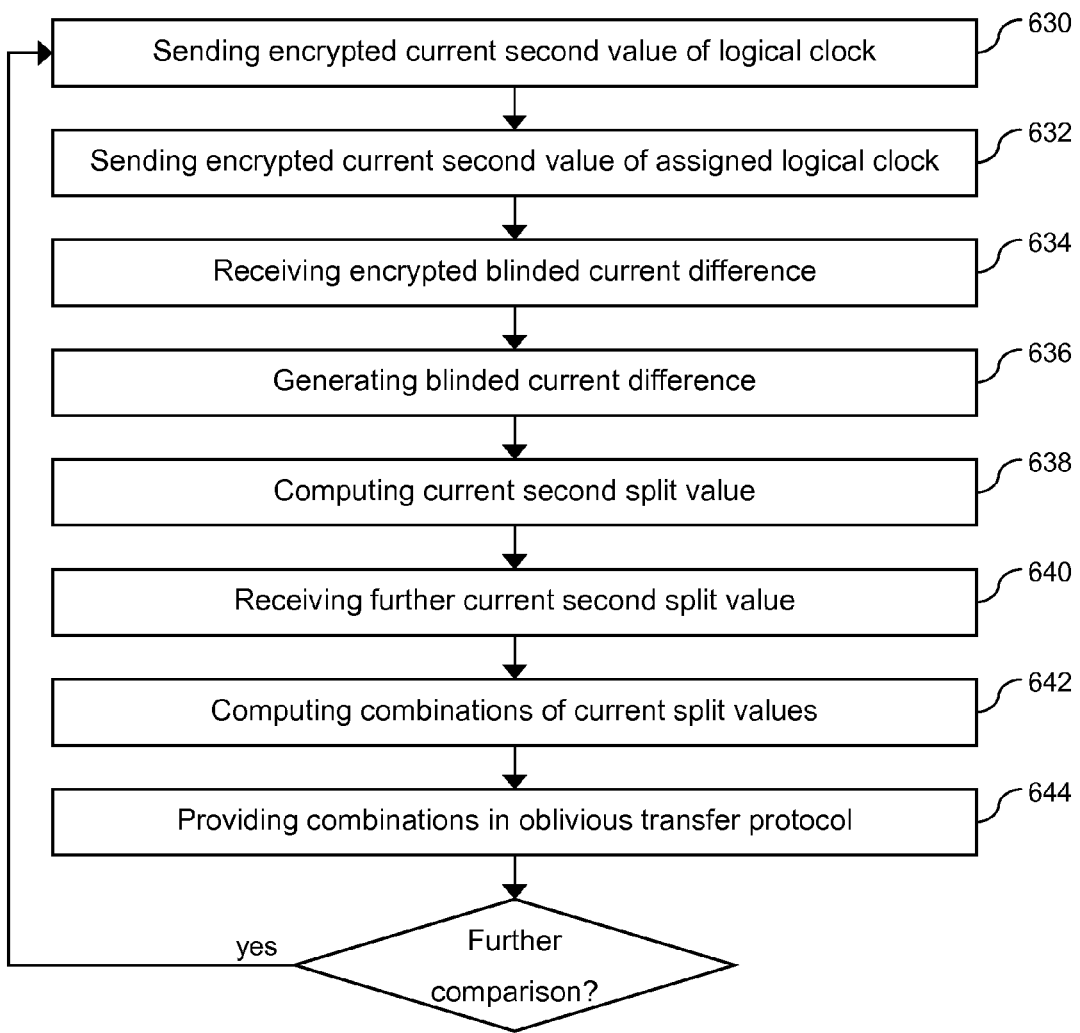
FIG. 5B is a flow diagram of further operations of an example method according to an embodiment.

FIG. 5B is a flow diagram of further operations of an example method 600 according to an embodiment. The further operations may be a part of a secure comparison operation. In an example, method 600 may include sending 626 the values to the comparison system 300 in accordance to a secure comparison operation. In a different method according to an embodiment, sending 626 the values to the comparison system 300 may be executed without using a secure comparison operation.

The method 600 may include sending 630 an encrypted current second value of the logical clock to the comparison system 300. The encrypted current second value of the logical clock may be computable with the homomorphic encryption function and the public key from the current second value of the logical clock.

Sending 632 an encrypted current second value of the assigned logical clock to the comparison system 300 may follow. The encrypted current second value of the assigned logical clock may be computable with the assigned homomorphic encryption function and the assigned public key from the current second value of the assigned logical clock.

Receiving 634 an encrypted blinded current difference of the assigned logical clock may follow. The encrypted blinded current difference may be related to a difference between the current second value and a current first value of the assigned logical clock. A blinded current difference may be computable from an intermediate result. The intermediate result may be computed by multiplying a current difference between the current second value and the current first value with a further first blinding value and by subtracting a further second blinding value. The absolute value of the further first blinding value may be greater than the absolute value of the further second blinding value. In an example part, the further first blinding value may be greater than the further second blinding value and the further second blinding value be greater than or equal to zero. In a further example part, the negative value of the further first blinding value may be less than the further second blinding value and the further second blinding value be less than or equal to zero. The sign of the intermediate result may be changed according to a current first split value. The current first split value and a current second split value may determine if the current first value is less than or equal to the current second value.

It may follow generating 636 the blinded current difference by decrypting the encrypted blinded current difference with an assigned private key of the assigned homomorphic encryption function.

It may further follow computing 638 the current second split value by evaluating if the blinded current difference is less than or equal to zero and receiving 640 a further current second split value.

The method 600 may include computing 642 combinations and providing 644 the combinations in an oblivious transfer protocol to the comparison system 300. The combination may combine the current second split value and the further current second split value with possible values of the current first split value and a further current first split value.

The method 600 may include operations of further comparison operations when for example more than one causal relation may be checked. The method 600 may be completed when no further comparison operations may be executed.

Figure 6A:
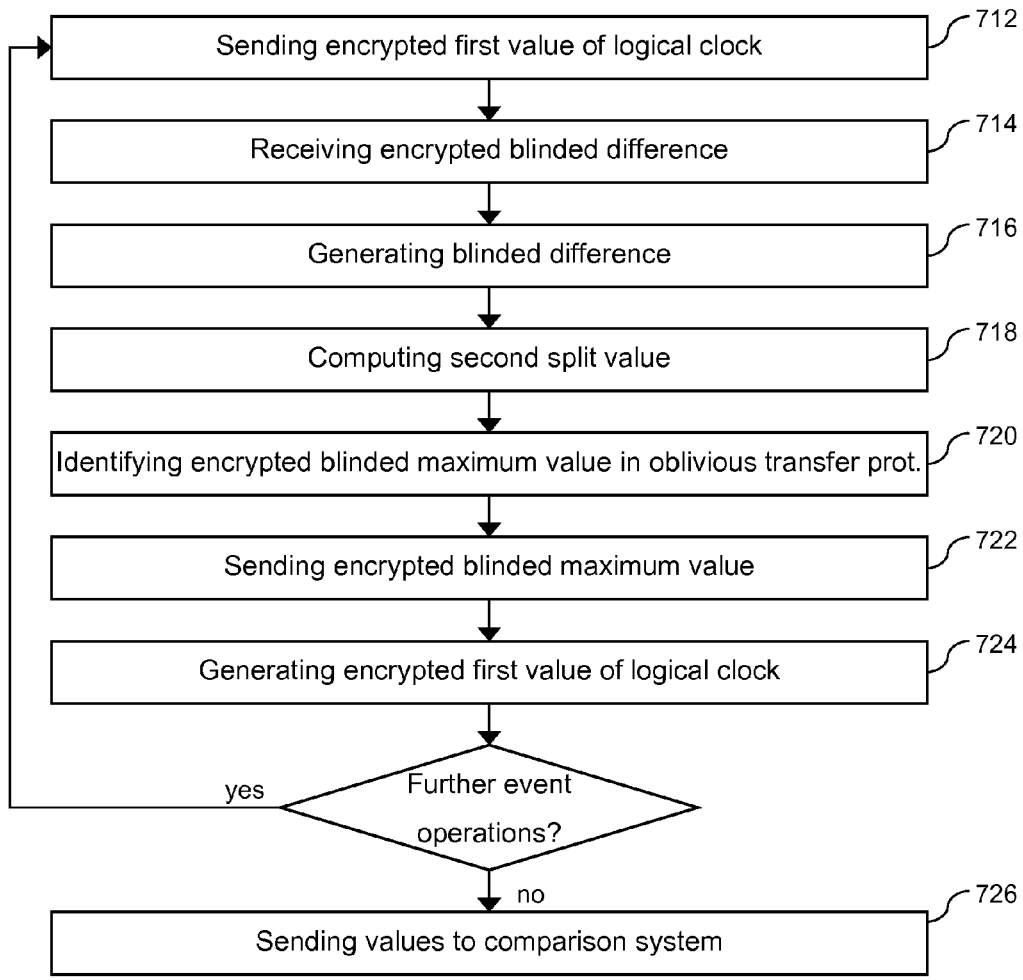
FIG. 6A is a flow diagram of operations of an example method according to an embodiment.

FIG. 6A is a flow diagram of operations of an example method 700 according to an embodiment. The method 700 may be a computer-implemented method 700 for participating in a processing of logical clock values. In an example, the processing of logical clock values may include operations of a secure maximum operation.

In an example, the method 700 may include sending 712 an encrypted first value of a logical clock to a participant system. In a further example according to an embodiment, sending 712 may not be an operation to be executed.

The method 700 may include receiving 714 an encrypted blinded difference between a first value of a logical clock and a second value of the logical clock. The blinded difference may be computable from an intermediate result. The intermediate result may be computed by multiplying a difference between the first value and the second value with a first blinding value and by subtracting a second blinding value. The first blinding value may be greater than the second blinding value and the second blinding value may be greater than or equal to zero. A sign of the intermediate result may be changed according to a first split value. The first split value and a second split value may be used to determine if the first value is less than or equal to the second value.

The method 700 may include generating 716 the blinded difference and computing 718 the second split value. Generating 716 may include decrypting the encrypted blinded difference with a private key of the homomorphic encryption function. In an example, the homomorphic encryption function may be semantically secure and furthermore, the modulus of a domain of the homomorphic encryption function may be public. The second split value may be computed by evaluating if the blinded difference is less than or equal to zero.

Identifying 720 an encrypted blinded maximum value may follow. Identifying 720 may include selecting a value from a set of values in an oblivious transfer protocol. Furthermore, identifying 720 may include multiplying the selected value with an encrypted value of a neutral element of the homomorphic encryption function. This may be according to the second split value. The set of values may include an encrypted blinded first value and an encrypted blinded second value.

The method 700 may further include sending 722 the encrypted blinded maximum value to a participant system. This may complete operations of a secure comparison operation.

As a part of an increment operation, method 700 may include generating 724 an encrypted value of the logical clock. The encrypted value of the logical clock may be identical to an encrypted incremented previous value of the logical clock. The encryption may use the homomorphic encryption function and the public key.

The method 700 may be completed by executing operations of a comparison operation that may or may not be a secure comparison operation. The comparison operation may include sending 726 values related to a current first value of the logical clock and a current first value of an assigned logical clock to a comparison system 300.

Figure 6B:
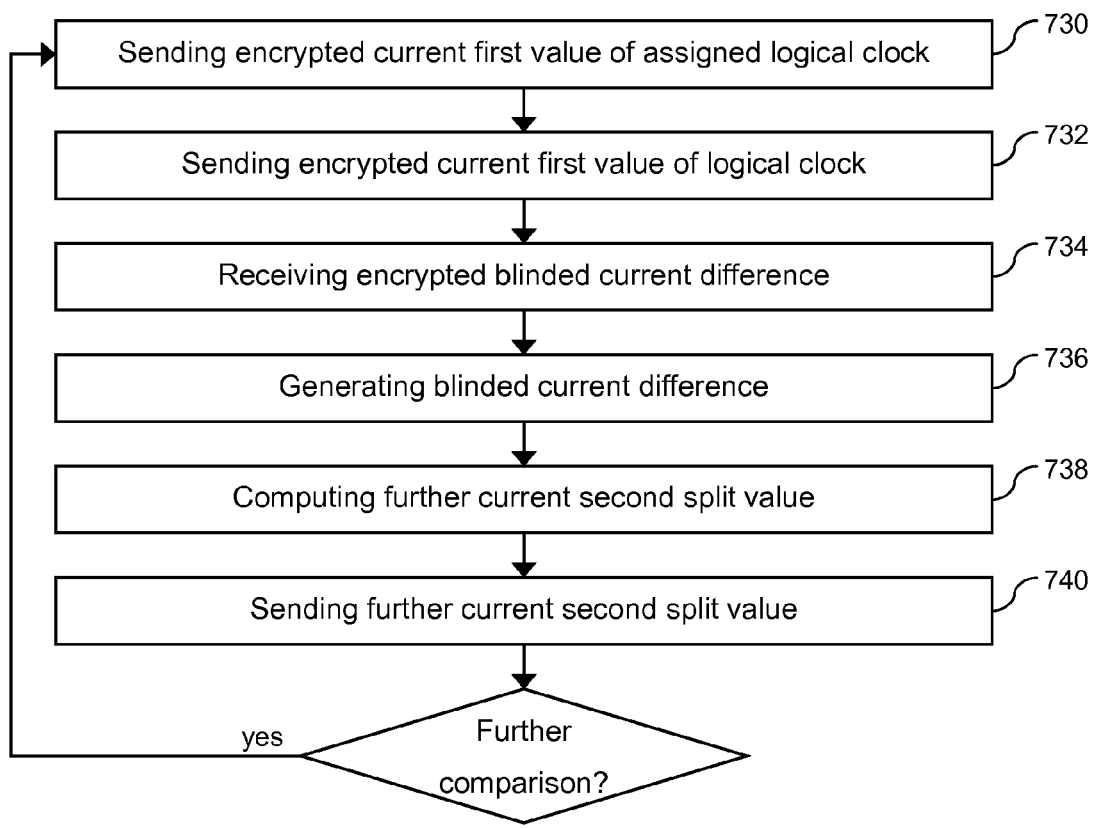
FIG. 6B is a flow diagram of further operations of an example method according to an embodiment.

FIG. 6B is a flow diagram of further operations of an example method according to an embodiment. The further operations may be part of a secure comparison operation and an embodiment of sending 726 the values related to the current first value of the logical clock to the comparison system 300.

Accordingly, the method 700 may include sending 730 an encrypted current first value of an assigned logical clock to the comparison system 300. The encrypted current first value of the assigned logical clock may be computable with an assigned homomorphic encryption function and an assigned public key from the current first value of the assigned logical clock.

Sending 732 an encrypted current first value of the logical clock to the comparison system 300 may follow. The encrypted current first value of the logical clock may be computable with the homomorphic encryption function and the public key from the current first value of the logical clock Receiving 734 an encrypted blinded current difference of the logical clock may follow. The encrypted blinded current difference of the logical clock may be related to a difference between the current first value of the logical clock and a current second value of the logical clock. The blinded current difference of the logical clock may be computable from an intermediate result. The intermediate result may be computed by multiplying a current difference between the current first value and the current second value with a further first blinding value and by subtracting a further second blinding value. The absolute value of the further first blinding value may be greater than the absolute value of the further second blinding value. In an example, this may mean that the further first blinding value is greater than the further second blinding value and the further second blinding value is greater than or equal to zero. In a further example, this may mean that the negative value of the further first blinding value is less than the further second blinding value and the further second blinding value is less than or equal to zero. A sign of the intermediate result may be changed according to a current first split value. The current first split value and a current second split value may be used to determine if the current first value is less than or equal to the current second value.

The method 700 may include generating 736 the blinded current difference of the logical clock by decrypting the encrypted blinded current difference with the private key of the homomorphic encryption function.

Computing 738 the further current second split value may include evaluating if the blinded current difference is less than or equal to zero.

When no further comparisons operations are to be execute, the method 700 may be completed with sending 740 the further current second split value to the participant system 300.

Figure 7:
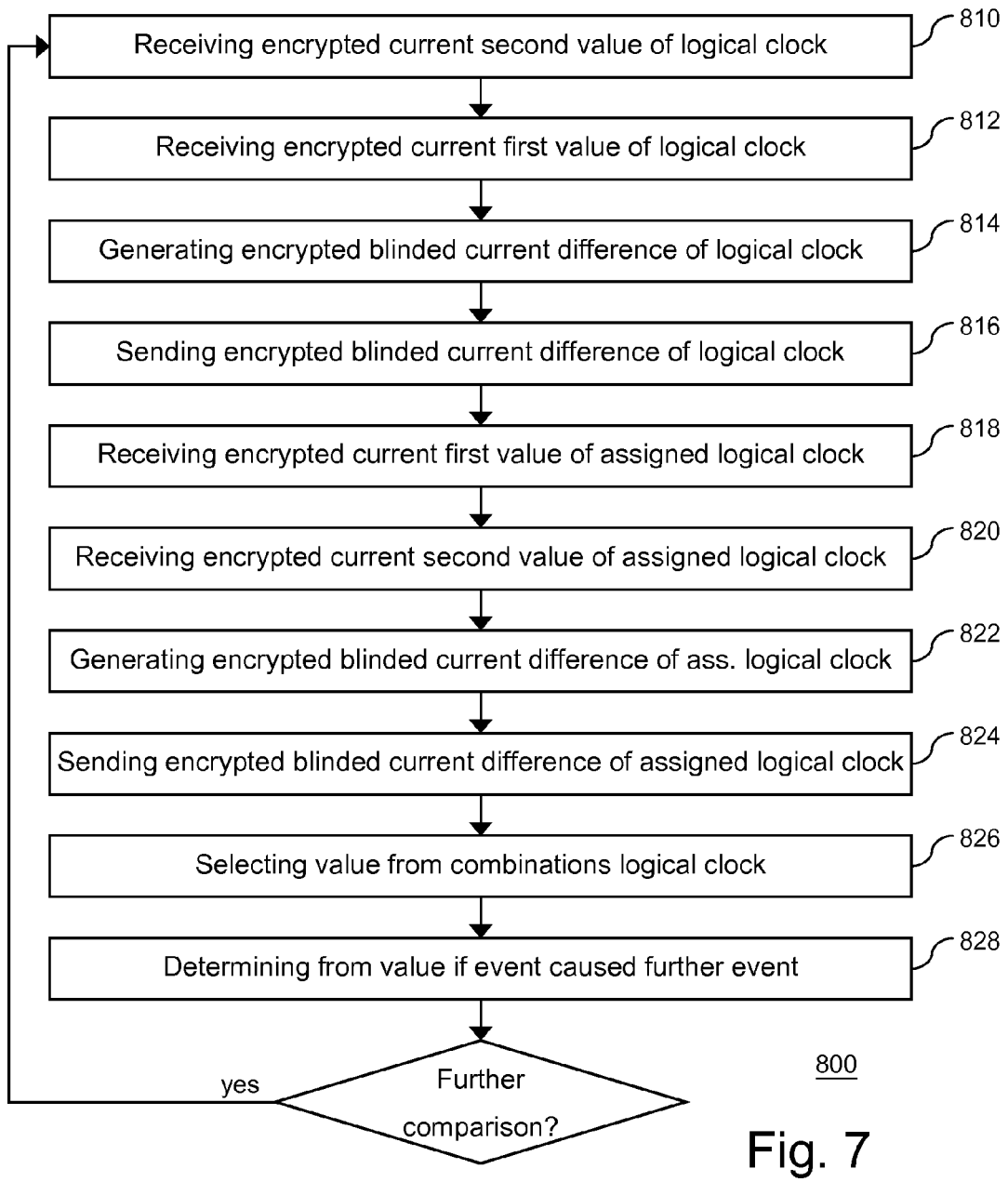
FIG. 7 is a flow diagram of operations of an example method according to an embodiment.

FIG. 7 is a flow diagram of operations of an example method 800 according to an embodiment. The method 800 may be a computer-implemented method for comparing values of logical clocks according to a secure comparison protocol.

The method 800 may include receiving 810 an encrypted current second value of a logical clock. The encrypted current second value of the logical clock may be computable with a homomorphic encryption function and a public key from a current second value of the logical clock.

The method 800 may include receiving 812 an encrypted current first value of the logical clock. The encrypted current first value of the logical clock may be computable with the homomorphic encryption function and the public key from a current first value of the logical clock. In an example, operation receiving 812 may be independent of operation receiving 810 and therefore, operation receiving 812 may also be executed prior to operation receiving 810.

Generating 814 an encrypted blinded current difference of the logical clock may follow. The encrypted blinded current difference of the logical clock may be related to a difference between the current first value of the logical clock and the current second value of the logical clock. A blinded current difference may be computable from an intermediate result. The intermediate result may be computed by multiplying a current difference between the current first value of the logical clock and the current second value of the logical clock with a first blinding value and by subtracting a second blinding value. The absolute value of the first blinding value may be greater than the absolute value of the second blinding value. In an example, the first blinding value may be greater than the second blinding value and the second blinding value may be greater than or equal to zero. In a further example, the negative value of the first blinding value may be less than the second blinding value and the second blinding value may be less than or equal to zero. In an example, the first blinding value and the second blinding value may be random values determined according to given constraints. A sign of the intermediate result may be changed according to a current first split value. The current first split value and a current second split value may determine if the current first value is less than or equal to the current second value.

Sending 816 the encrypted blinded current difference of the logical clock to a participant system may follow.

Receiving 818 an encrypted current first value of an assigned logical clock may follow. The encrypted current first value of the assigned logical clock may be computable with an assigned homomorphic encryption function and an assigned public key from a current first value of the assigned logical clock.

Receiving 820 an encrypted current second value of the assigned logical clock may follow. The encrypted current second value of the assigned logical clock may be computable with the assigned homomorphic encryption function and the assigned public key from a current second value of the assigned logical clock.

The method 800 may include generating 822 an encrypted blinded current difference of the assigned logical clock. The encrypted blinded current difference of the assigned logical clock may be related to a difference between the current first value of the assigned logical clock and the current second value of the assigned logical clock. The blinded further current difference being computable from a further intermediate result. The intermediate result may be computed by multiplying a further current difference between the current first value of the assigned logical clock and the current second value of the assigned logical clock with a further first blinding value and by subtracting a further second blinding value. The absolute value of the further first blinding value may be greater than the absolute value of the further second blinding value. In an example, the further first blinding value may be greater than the further second blinding value and the further second blinding value may be greater than or equal to zero. In a further example, the negative value of the further first blinding value may be less than the further second blinding value and the further second blinding value may be less than or equal to zero. In an example, the further first blinding value and the further second blinding value may be random values determined according to given constraints. A sign of the further intermediate result may be changed according to a further current first split value. The further current first split value and a further current second split value may determine if the current first value of the assigned logical clock is less than or equal to the current second value of the assigned logical clock.

The method 800 may include sending 824 the encrypted blinded current difference of the assigned logical clock to a further participant system.

Selecting 826 a value from combinations may follow. The combinations may combine the current second split value and the further current second split value with possible values of the current first split value and the further current first split value. Selecting 826 may be according to the current first split value and the further current first split value.

The method 800 may include determining 828 from the value if an event from the participant system has a causal relation to an event from the further participant system. In an example scenario, this may mean that the event from the participant system cause the event from the further participant system. In a further example scenario, this may mean that the event from the participant system has been caused by the event from the further participant system. The event from the participant system may be specified by the current first value of the logical clock and the current first value of the assigned logical clock. The event from the further participant system may be specified by the current second value of the logical clock and the current second value of the assigned logical clock. The method 800 may be completed with determining 828 when no further comparisons are to be executed and accordingly no further causal relations are to be checked.

In an example, the modulus of a domain of the homomorphic encryption function may be public and the modulus of a domain of the assigned homomorphic encryption function may be public.

Furthermore, the homomorphic encryption function and the assigned homomorphic encryption function may be semantically secure homomorphic encryption functions.

Figure 8:
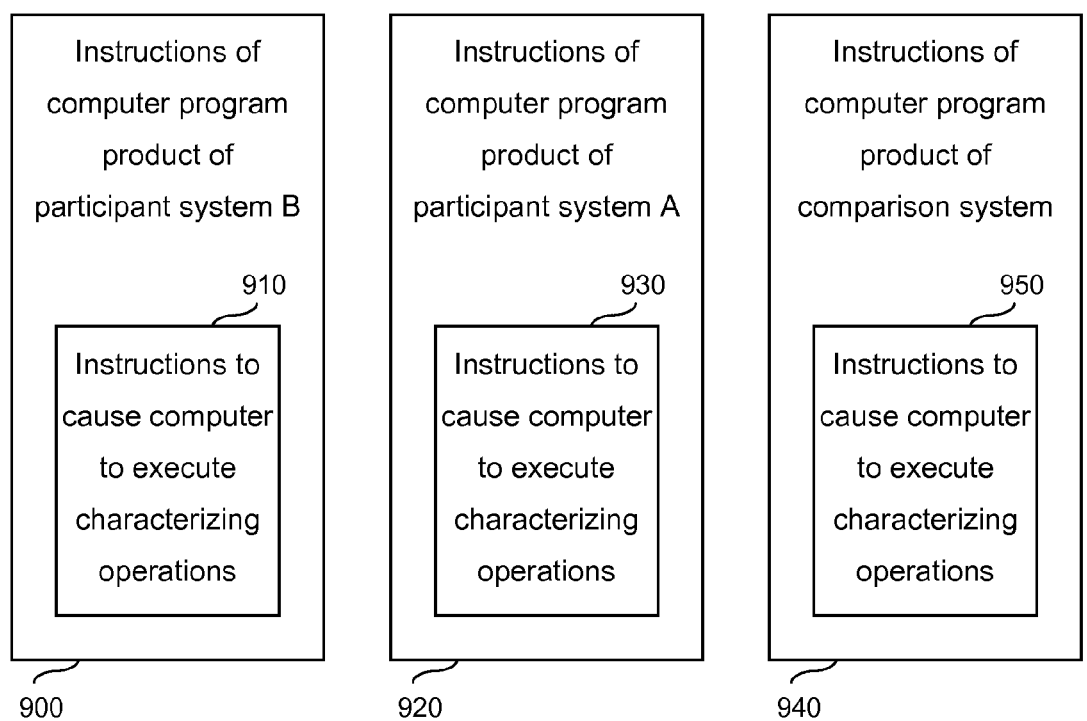
FIG. 8 is a block diagram of computer program products according to embodiments.

FIG. 8 is a block diagram of computer program products according to embodiments. The computer program products include a computer program product 900 with instructions 910, a computer program product 920 with instructions 930, and computer program product 940 with instructions 950.

The instructions 910 may be configured to be loaded to a computer system and cause the computer system to execute operations of the method 600 (see FIG. 5A and FIG. 5B).

In an example, the instructions 910 may cause the computer system to execute operations: receiving 610 the encrypted first value of a logical clock, accessing 612 the encrypted second value of the logical clock, generating 614 the encrypted blinded difference between the first value and the second value, sending 616 the encrypted blinded difference, providing 618 the encrypted blinded first value and the encrypted blinded second value in an oblivious transfer protocol, receiving 620 the encrypted blinded maximum value, and generating 622 the encrypted maximum value.

The instructions 930 may be configured to be loaded to a computer system and cause the computer system to execute operations of the method 700 (see FIG. 6A and FIG. 6B).

In an example, the instructions 930 may cause the computer system to execute operations: receiving 714 the encrypted blinded difference, generating 716 the blinded difference, computing 718 the second split value, identifying 720 the encrypted blinded maximum value, and sending 722 the encrypted blinded maximum value.

The instructions 950 may be configured to be loaded to a computer system and cause the computer system to execute operations of the method 800 (see FIG. 7).

In an example, the instructions 950 may cause the computer system to execute operations: receiving 810 the encrypted current second value of a logical clock, receiving 812 the encrypted current first value of the logical clock, generating 814 the encrypted blinded current difference of the logical clock, sending 816 the encrypted blinded current difference of the logical clock, receiving 818 the encrypted current first value of an assigned logical clock, receiving 820 the encrypted current second value of the assigned logical clock, generating 822 the encrypted blinded current difference of the assigned logical clock, sending 824 the encrypted blinded current difference of the assigned logical clock, selecting 826 the value from combinations of the current second split value and the further current second split value, and determining 828 from the value if an event from the participant system caused an event from the further participant system.

As noted above, example embodiments may include computer program products. The computer program products may be stored on computer-readable media for carrying or having computer-executable instructions or data structures. Such computer-readable media may be any available media that can be accessed by a general purpose or special purpose computer. By way of example, such computer-readable media may include RAM, ROM, EPROM, EEPROM, CD-ROM or other optical disk storage, magnetic disk storage or other magnetic storage devices, or any other medium that may be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is an example of a computer-readable medium. Combinations of the above are also to be included within the scope of computer-readable media. Computer-executable instructions include, for example, instructions and data which cause a general purpose computer, a special purpose computer, or a special purpose processing device to perform a certain function or group of functions. Furthermore, computer-executable instructions include, for example, instructions that have to be processed by a computer to transform the instructions into a format that is executable by a computer. The computer-executable instructions may be in a source format that is compiled or interpreted to obtain the instructions in the executable format. When the computer-executable instructions are transformed, a first computer may for example transform the computer-executable instructions into the executable format and a second computer may execute the transformed instructions. The computer-executable instructions may be organized in a modular way so that a part of the instructions may belong to one module and a further part of the instructions may belong to a further module. However, the differences between different modules may not be obvious and instructions of different modules may be intertwined.

Example embodiments have been described in the general context of method operations, which may be implemented in one embodiment by a computer program product including computer-executable instructions, such as program code, executed by computers in networked environments. Generally, program modules include for example routines, programs, objects, components, or data structures that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such operations.

Some embodiments may be operated in a networked environment using logical connections to one or more remote computers having processors. Logical connections may include for example a local area network (LAN) and a wide area network (WAN). The examples are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, handheld devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An example system for implementing the overall system or portions might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, hardware implementations, or equipment for receiving manual inputs.

The invention claimed is:

1. A system for processing logical clock values, the system including instructions recorded on a computer-readable medium and comprising:

a communication unit configured to:

receive an encrypted first value of a logical clock, the encrypted first value of the logical clock is computed with a homomorphic encryption function and a public key from a first value of the logical clock, send an encrypted blinded difference to a participant system, receive an encrypted blinded maximum value, a maximum value being identical to the maximum of the first value of the logical clock and a second value of the logical clock; and a processing unit configured to:

access an encrypted second value of the logical clock, the encrypted second value of the logical clock is computed with the homomorphic encryption function and a public key from the second value of the logical clock, generate the encrypted blinded difference between the first value of the logical clock and the second value of the logical clock without decrypting the encrypted first value of the logical clock and the encrypted second value of the logical clock, a blinded difference is computed from an intermediate result computed by multiplying a difference between the first value of the logical clock and the second value of the logical clock with a first blinding value and by subtracting a second blinding value, the first blinding value being greater than the second blinding value and the second blinding value being greater than or equal to zero, change a sign of the intermediate result according to a first split value, the first split value and a second split value determining if the first value of the logical clock is less than or equal to the second value of the logical clock based on an exclusive-or of the of the first split value and the second split value, provide an encrypted blinded first value and an encrypted blinded second value in an oblivious transfer protocol to the participant system, a blinded first value is computed by adding a third blinding value to the first value of the logical clock and a blinded second value is computed by adding the third blinding value to the second value of the logical clock, and generate an encrypted maximum value from the encrypted blinded maximum value by selecting a value from a set of provided values according to the oblivious transfer protocol, the value being selected from the provided values using the second split value and indices of the provided values.

2. The system of claim 1, wherein the first blinding value, the second blinding value, and the third blinding value are random values.

3. The system of claim 2, wherein a modulus of a domain of the homomorphic encryption function is public and the third blinding value is uniformly determined within the domain of the homomorphic encryption function.

4. The system of claim 1, wherein the homomorphic encryption function is a semantically secure homomorphic encryption function.

5. The system of claim 4, wherein the encrypted blinded maximum value has been computed by multiplying a value selected in the oblivious transfer protocol with an encrypted value of a neutral element of the homomorphic encryption function.

6. The system claim 1, wherein the processing unit is further configured to generate an encrypted second value of an assigned logical clock, the encrypted second value of the assigned logical clock being identical to an encrypted incremented previous second value of the assigned logical clock encrypted with an assigned homomorphic encryption function and an assigned public key.

7. The system of claim 6, wherein the communication unit is further configured to send values related to a current second value of the logical clock and a current second value of the assigned logical clock to a comparison system.

8. The system of claim 7, wherein:
the communication unit is further configured to:
send an encrypted current second value of the logical clock to the comparison system, the encrypted current second value of the logical clock is computed with the homomorphic encryption function and the public key from the current second value of the logical clock,
send an encrypted current second value of the assigned logical clock to the comparison system, the encrypted current second value of the assigned logical clock with the assigned homomorphic encryption function and the assigned public key from the current second value of the assigned logical clock,
receive an encrypted blinded current difference of the assigned logical clock between the current second value of the assigned logical clock and a current first value of the assigned logical clock, the blinded current difference is computed from an intermediate result computed by multiplying a current difference between the current second value of the logical clock and the current first value of the logical clock with a further first blinding value and by subtracting a further second blinding value, the absolute value of the further first blinding value being greater than the absolute value of the further second blinding value,
change a sign of the intermediate result according to a current first split value, the current first split value and a current second split value determining if the current first value of the logical clock is less than or equal to the current second value of the logical clock based on an exclusive-or of the of the current first split value and the current second split value,
receive a further current second split value; and
the processing unit is further configured to:
generate the blinded current difference by decrypting the encrypted blinded current difference with an assigned private key of the assigned homomorphic encryption function,
compute the current second split value by evaluating if the blinded current difference is less than or equal to zero,
compute combinations of the current second split value and the further current second split value with possible values of the current first split value and a further current first split value, and
provide the combinations in an oblivious transfer protocol to the comparison system.

9. A system for participating in a processing of logical clock values, the system including instructions recorded on a compute readable medium and comprising:
a communication unit configured to:
receive an encrypted blinded difference between a first value of a logical clock and a second value of the logical clock, a blinded difference is computed from an intermediate result computed by multiplying a difference between the first value of the logical clock and the second value of the logical clock with a first blinding value and by subtracting a second blinding value, the first blinding value being greater than the second blinding value and the second blinding value being greater than or equal to zero,
change a sign of the intermediate result according to a first split value, the first split value and a second split value determining if the first value of the logical clock is less than or equal to the second value of the logical clock based on an exclusive-or of the of the first split value and the second split value, and
send an encrypted blinded maximum value to a participant system; and
a processing unit configured to:
generate the blinded difference by decrypting the encrypted blinded difference with a private key of the homomorphic encryption function without decrypting the encrypted first value of the logical clock and the encrypted second value of the logical clock,
compute the second split value by evaluating if the blinded difference is less than or equal to zero, and
identify the encrypted blinded maximum value by selecting a value from a set of values in an oblivious transfer protocol according to the second split value, the set of values comprising an encrypted blinded first value and an encrypted blinded second value.

10. The system of claim 9, wherein a modulus of a domain of the homomorphic encryption function is public.

11. The system of claim 9, wherein the homomorphic encryption function is a semantically secure homomorphic encryption function.

12. The system of claim 11, wherein the processing unit is configured to identify the encrypted blinded maximum value by multiplying the selected value with an encrypted value of a neutral element of the homomorphic encryption function.

13. The system of claim 9, wherein the communication unit is further configured to send an encrypted first value of the logical clock to the participant system.

14. The system of claim 9, wherein the processing unit is further configured to generate an encrypted value of the logical clock, the encrypted value of the logical clock being identical to an encrypted incremented previous value of the logical clock encrypted with the homomorphic encryption function and the public key.

15. The system of claim 9, wherein the communication unit is further configured to send values related to a current first value of the logical clock and a current first value of an assigned logical clock to a comparison system.

16. The system of claim 15, wherein:
the communication unit is further configured to:
send an encrypted current first value of an assigned logical clock to the comparison system, the encrypted current first value of the assigned logical clock is computed with an assigned homomorphic encryption function and an assigned public key from the current first value of the assigned logical clock,
send an encrypted current first value of the logical clock to the comparison system, the encrypted current first value of the logical clock is computed with the homomorphic encryption function and the public key from the current first value of the logical clock,
receive an encrypted blinded current difference of the logical clock between the current first value of the logical clock and a current second value of the logical clock, the blinded current difference of the logical clock is computed from an intermediate result computed by multiplying a current difference between the current first value of the logical clock and the current second value of the logical clock with a further first blinding value and by subtracting a further second blinding value, the absolute value of the first blinding value being greater than the absolute value of the second blinding value,
change a sign of the intermediate result according to a current first split value, the current first split value and a current second split value determining if the current first value of the logical clock is less than or equal to the current second value of the logical clock based on an exclusive-or of the of the first split value and the second split value,
send the further current second split value to the participant system; and the processing unit is further configured to:
generate the blinded current difference of the logical clock by decrypting the encrypted blinded current difference with the private key of the homomorphic encryption function,
compute the further current second split value by evaluating if the blinded current difference is less than or equal to zero.

17. A system for comparing values of logical clocks, the system including instructions recorded on a computer-readable medium and comprising:

a communication unit configured to:
receive an encrypted current second value of a logical clock, the encrypted current second value of the logical clock is computed with a homomorphic encryption function and a public key from a current second value of the logical clock,
receive an encrypted current first value of the logical clock, the encrypted current first value of the logical clock is computed with the homomorphic encryption function and the public key from a current first value of the logical clock,
send an encrypted blinded current difference of the logical clock to a participant system,
receive an encrypted current first value of an assigned logical clock, the encrypted current first value of the assigned logical clock is computed with an assigned homomorphic encryption function and an assigned public key from a current first value of the assigned logical clock,
receive an encrypted current second value of the assigned logical clock, the encrypted current second value of the assigned logical clock is computed with the assigned homomorphic encryption function and the assigned public key from a current second value of the assigned logical clock, and
send the encrypted blinded current difference of the assigned logical clock to a further participant system; and
a processing unit configured to:
generate the encrypted blinded current difference of the logical clock between the current first value of the logical clock and the current second value of the logical clock without decrypting the encrypted current first value of the logical clock and the encrypted current second value of the logical clock, a blinded current difference is computed from an intermediate result computed by multiplying a current difference between the current first value of the logical clock and the current second value of the logical clock with a first blinding value and by subtracting a second blinding value, the absolute value of the first blinding value being greater than the absolute value of the second blinding value,
change a sign of the intermediate result according to a current first split value, the current first split value and a current second split value determining if the current first value of the logical clock is less than or equal to the current second value of the logical clock based on an exclusive-or of the of the first split value and the second split value,
generate the encrypted blinded current difference of the assigned logical clock between the current first value of the assigned logical clock and the current second value of the assigned logical clock without decrypting the encrypted current first value of the logical clock and the encrypted current second value of the logical clock, the blinded further current difference is computed from a further intermediate result computed by multiplying a further current difference between the current first value of the assigned logical clock and the current second value of the assigned logical clock with a further first blinding value and by subtracting a further second blinding value, the absolute value of the further first blinding value being greater than the absolute value of the further second blinding value, a sign of the further intermediate result being changed according to a further current first split value, the further current first split value and a further current second split value determining if the current first value of the assigned logical clock is less than or equal to the current second value of the assigned logical clock, select a value from combinations of the current second split value and the further current second split value with possible values of the current first split value and the further current first split value in an oblivious transfer protocol according to the current first split value and the further current first split value, and determine from the value if an event from the participant system specified by the current first value of the logical clock and the current first value of the assigned logical clock has a causal relation to an event from the further participant system specified by the current second value of the logical clock and the current second value of the assigned logical clock.

18. The system of claim 17, wherein the first blinding value, the second blinding value, the further first blinding value, and the further second blinding value are random values.

19. The system of claim 17, wherein a modulus of a domain of the homomorphic encryption function is public and wherein a modulus of a domain of the assigned homomorphic encryption function is public.

20. The system of claim 17, wherein the homomorphic encryption function and the assigned homomorphic encryption function are semantically secure homomorphic encryption functions.

21. A computer-implemented method for processing logical clock values, the method comprising:

receiving an encrypted first value of a logical clock, the encrypted first value of the logical clock is computed with a homomorphic encryption function and a public key from a first value of the logical clock;

accessing an encrypted second value of the logical clock, the encrypted second value of the logical clock is computed with the homomorphic encryption function and the public key from a second value of the logical clock;

generating an encrypted blinded difference between the first value of the logical clock and the second value of the logical clock without decrypting the encrypted first value of the logical clock and the encrypted second value of the logical clock, the blinded difference is computed from an intermediate result computed by multiplying a difference between the first value of the logical clock and the second value of the logical clock with a first blinding value and by subtracting a second blinding value, the first blinding value being greater than the second blinding value and the second blinding value being greater than or equal to zero, changing a sign of the intermediate result according to a first split value, the first split value and a second split value determining if the first value of the logical clock is less than or equal to the second value of the logical clock based on an exclusive-or of the of the first split value and the second split value;

sending the encrypted blinded difference to a participant system;

providing an encrypted blinded first value and an encrypted blinded second value in an oblivious transfer protocol to the participant system, a blinded first value is computed by adding a third blinding value to the first value of the logical clock and a blinded second value is computed by adding the third blinding value to the second value of the logical clock;

receiving an encrypted blinded maximum value, a maximum value being identical to the maximum of the first value of the logical clock and the second value of the logical clock; and generating an encrypted maximum value from the encrypted blinded maximum value by selecting a value from a set of provided values according to the oblivious transfer protocol, the value being selected from the provided values using the second split value and indices of the provided values.

22. The method of claim 21, wherein the first blinding value, the second blinding value, and the third blinding value are random values.

23. The method of claim 22, wherein a modulus of a domain of the homomorphic encryption function is public and the third blinding value is uniformly determined within the domain of the homomorphic encryption function.

24. The method of claim 21, wherein the homomorphic encryption function is a semantically secure homomorphic encryption function.

25. The method of claim 24, wherein the encrypted blinded maximum value has been computed by multiplying a value selected in the oblivious transfer protocol with an encrypted value of a neutral element of the homomorphic encryption function.

26. The method of claim 21, further generating an encrypted value of an assigned logical clock, the encrypted value of the assigned logical clock being identical to an encrypted incremented previous value of the assigned logical clock encrypted with an assigned homomorphic encryption function and an assigned public key.

27. The method of claim 26, further sending values related to a current second value of the logical clock and a current second value of the assigned logical clock to a comparison system.

28. The method of claim 27, wherein sending the values related to the current second value of the logical clock and the current second value of the assigned logical clock to the comparison system comprises:

sending an encrypted current second value of the logical clock to the comparison system, the encrypted current second value of the logical clock is computed with the homomorphic encryption function and the public key from the current second value of the logical clock;

sending an encrypted current second value of the assigned logical clock to the comparison system, the encrypted current second value of the assigned logical clock is computed with the assigned homomorphic encryption function and the assigned public key from the current second value of the assigned logical clock;

receiving an encrypted blinded current difference of the assigned logical clock between the current second value and a current first value of the assigned logical clock, a blinded current difference is computed from an intermediate result computed by multiplying a current difference between the current second value and the current first value of the assigned logical clock with a further first blinding value and by subtracting a further second blinding value, the absolute value of the further first blinding value being greater than the absolute value of the further second blinding value, changing a sign of the intermediate result according to a current first split value, the current first split value and a current second split value determining if the current first value of the assigned logical clock is less than or equal to the current second value of the assigned logical clock based on an exclusive-or of the of the current first split value and the current second split value;

generating the blinded current difference by decrypting the encrypted blinded current difference with an assigned private key of the assigned homomorphic encryption function without decrypting the encrypted first value of the logical clock and the encrypted second value of the logical clock;

computing the current second split value by evaluating if the blinded current difference is less than or equal to zero;

receiving a further current second split value;

computing combinations of the current second split value and the further current second split value with possible values of the current first split value and a further current first split value; and providing the combinations in an oblivious transfer protocol to the comparison system.

29. A computer-implemented method for participating in a processing of logical clock values, the method comprising:

receiving an encrypted blinded difference between a first value of a logical clock and a second value of the logical clock, the blinded difference is computed from an intermediate result computed by multiplying a difference between the first value of the logical clock and the second value of the logical clock with a first blinding value and by subtracting a second blinding value, the first blinding value being greater than the second blinding value and the second blinding value being greater than or equal to zero, changing a sign of the intermediate result according to a first split value, the first split value and a second split value determining if the first value of the logical clock is less than or equal to the second value of the logical clock based on an exclusive-or of the of the first split value and the second split value;

generating the blinded difference by decrypting the encrypted blinded difference with a private key of the homomorphic encryption function;

computing the second split value by evaluating if the blinded difference is less than or equal to zero;

identifying an encrypted blinded maximum value by selecting a value from a set of values in an oblivious transfer protocol according to the second split value, the set of values comprising an encrypted blinded first value and an encrypted blinded second value; and sending the encrypted blinded maximum value to a participant system.

30. The method of claim 29, wherein a modulus of a domain of the homomorphic encryption function is public.

31. The method of claim 29, wherein the homomorphic encryption function is a semantically secure homomorphic encryption function.

32. The method of claim 31, wherein identifying the encrypted blinded maximum value comprises multiplying the selected value with an encrypted value of a neutral element of the homomorphic encryption function.

33. The method of claim 29, further sending the encrypted first value of a logical clock to the participant system.

34. The method of claim 29, further generating an encrypted value of the logical clock, the encrypted value of the logical clock being identical to an encrypted incremented previous value of the logical clock encrypted with the homomorphic encryption function and the public key.

35. The method of claim 29, further sending values related to a current first value of the logical clock and a current first value of an assigned logical clock to a comparison system.

36. The method of claim 35, wherein sending the values related to the current first value of the logical clock and the current first value of the assigned logical clock to the comparison system comprises:

sending an encrypted current first value of an assigned logical clock to the comparison system, the encrypted current first value of the assigned logical clock is computed with an assigned homomorphic encryption function and an assigned public key from the current first value of the assigned logical clock;

sending an encrypted current first value of the logical clock to the comparison system, the encrypted current first value of the logical clock is computed with the homomorphic encryption function and the public key from the current first value of the logical clock;

receiving an encrypted blinded current difference of the logical clock between the current first value of the logical clock and a current second value of the logical clock, the blinded current difference of the logical clock is computed from an intermediate result computed by multiplying a current difference between the current first value of the logical clock and the current second value of the logical clock with a further first blinding value and by subtracting a further second blinding value, the absolute value of the further first blinding value being greater than the absolute value of the further second blinding value, changing a sign of the intermediate result according to a current first split value, the current first split value and a current second split value determining if the current first value of the logical clock is less than or equal to the current second value of the logical clock based on an exclusive-or of the of the current first split value and the current second split value;

generating the blinded current difference of the logical clock by decrypting the encrypted blinded current difference with the private key of the homomorphic encryption function;

computing the further current second split value by evaluating if the blinded current difference is less than or equal to zero; and sending the further current second split value to a participant system.

37. A computer-implemented method for comparing values of logical clocks, the method comprising:

receiving an encrypted current second value of a logical clock, the encrypted current second value of the logical clock is computed with a homomorphic encryption function and a public key from a current second value of the logical clock;

receiving an encrypted current first value of the logical clock, the encrypted current first value of the logical clock is computed with the homomorphic encryption function and the public key from a current first value of the logical clock;

generating an encrypted blinded current difference of the logical clock between the current first value of the logical clock and the current second value of the logical clock without decrypting the encrypted current first value of the logical clock and the encrypted current second value of the logical clock, a blinded current difference is computed from an intermediate result computed by multiplying a current difference between the current first value of the logical clock and the current second value of the logical clock with a first blinding value and by subtracting a second blinding value, the absolute value of the first blinding value being greater than the absolute value of the second blinding value, changing a sign of the intermediate result according to a current first split value, the current first split value and a current second split value determining if the current first value of the logical clock is less than or equal to the current second value of the logical clock based on an exclusive-or of the of the current first split value and the current second split value;

sending the encrypted blinded current difference of the logical clock to a participant system;

receiving an encrypted current first value of an assigned logical clock, the encrypted current first value of the assigned logical clock is computed with an assigned homomorphic encryption function and an assigned public key from a current first value of the assigned logical clock;

receiving an encrypted current second value of the assigned logical clock, the encrypted current second value of the assigned logical clock is computed with the assigned homomorphic encryption function and the assigned public key from a current second value of the assigned logical clock;

generating an encrypted blinded current difference of the assigned logical clock between the current first value of the assigned logical clock and the current second value of the assigned logical clock without decrypting the encrypted current first value of the logical clock and the encrypted current second value of the logical clock, the blinded further current difference is computed from a further intermediate result computed by multiplying a further current difference between the current first value of the assigned logical clock and the current second value of the assigned logical clock with a further first blinding value and by subtracting a further second blinding value, the absolute value of the further first blinding value being greater than the absolute value of the further second blinding value, a sign of the further intermediate result being changed according to a further current first split value, the further current first split value and a further current second split value determining if the current first value of the assigned logical clock is less than or equal to the current second value of the assigned logical clock;

sending the encrypted blinded current difference of the assigned logical clock to a further participant system;

selecting a value from combinations of the current second split value and the further current second split value with possible values of the current first split value and the further current first split value according to the current first split value and the further current first split value; and determining from the value if an event from the participant system specified by the current first value of the logical clock and the current first value of the assigned logical clock has a causal relation to an event from the further participant system specified by the current second value of the logical clock and the current second value of the assigned logical clock.

38. The method of claim 37, wherein the first blinding value, the second blinding value, the further first blinding value, and the further second blinding value are random values.

39. The method of claim 37, wherein a modulus of a domain of the homomorphic encryption function is public and wherein a modulus of a domain of the assigned homomorphic encryption function is public.

40. The method of claim 37, wherein the homomorphic encryption function and the assigned homomorphic encryption function are semantically secure homomorphic encryption functions.

* * * * *